Nov. 28, 1933.  E. W. SIBLEY  1,937,327
METHOD AND APPARATUS FOR MAKING CARD HOLDING POCKETS
Filed Oct. 23, 1928   27 Sheets-Sheet 1
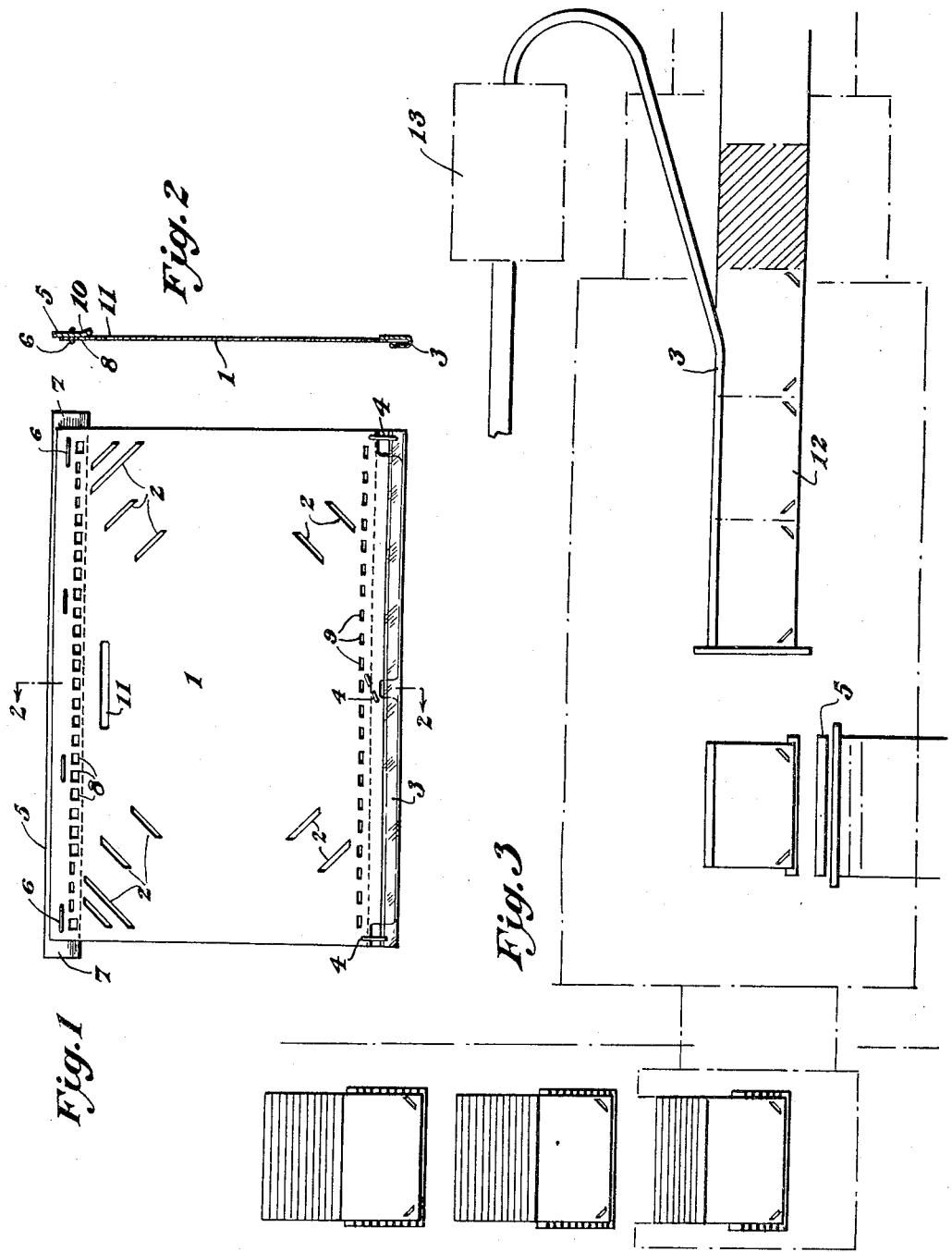
Inventor
Edward W. Sibley
by Barton A. Beau Jr
Attorney Nov. 28, 1933.  E. W. SIBLEY  1,937,327
METHOD AND APPARATUS FOR MAKING CARD HOLDING POCKETS
Filed Oct. 23, 1928  27 Sheets-Sheet 2
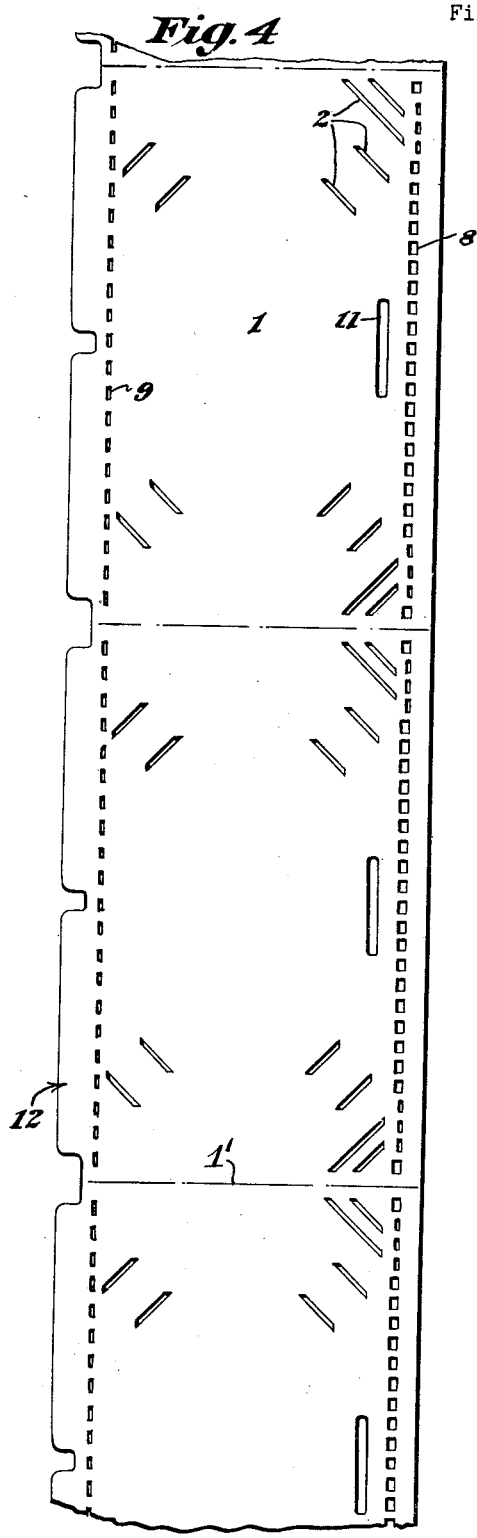
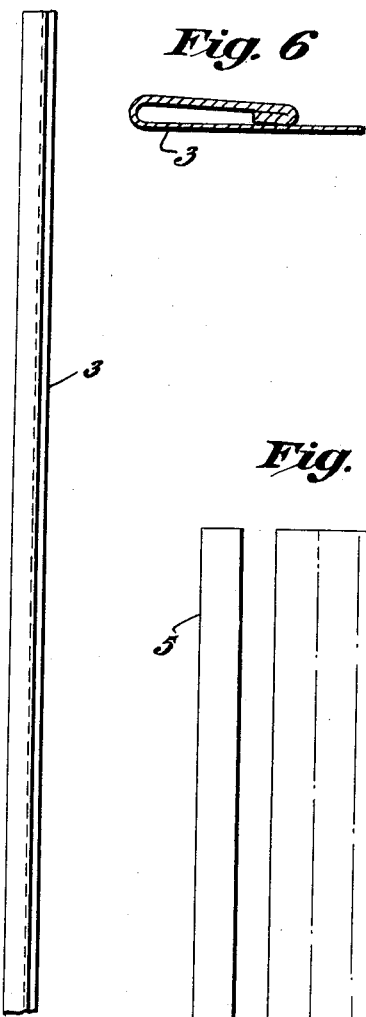
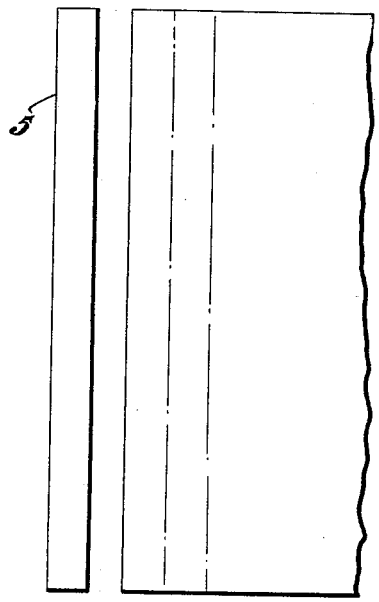
Inventor
Edward W. Sibley
by Barton A. Bean
Attorney

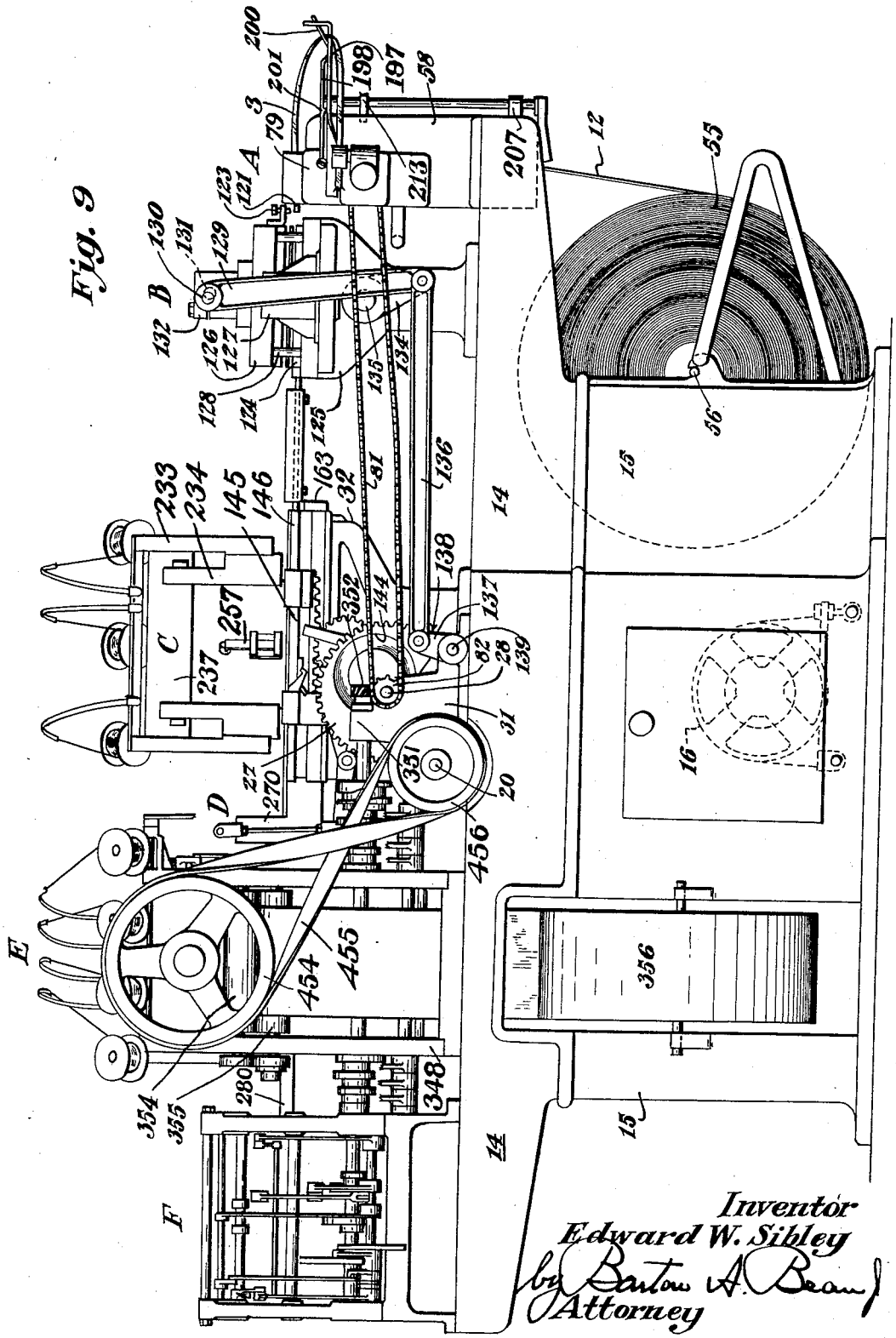

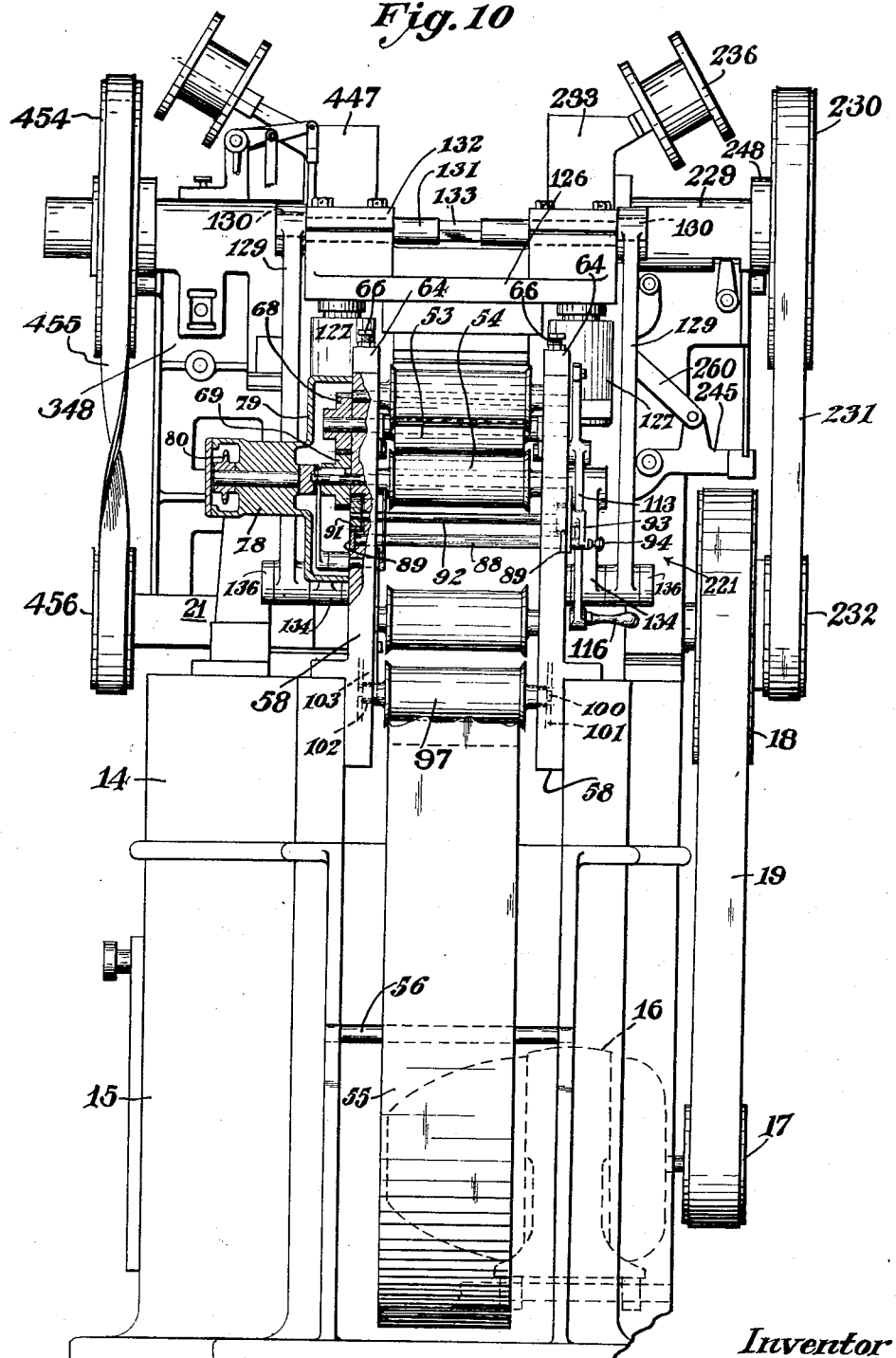

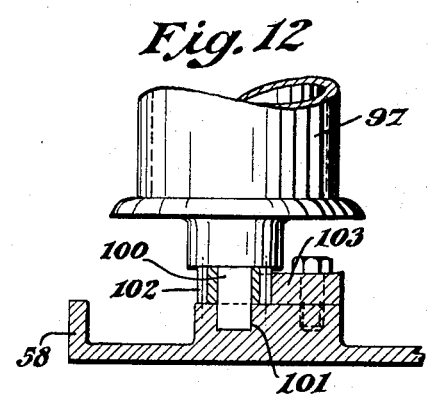
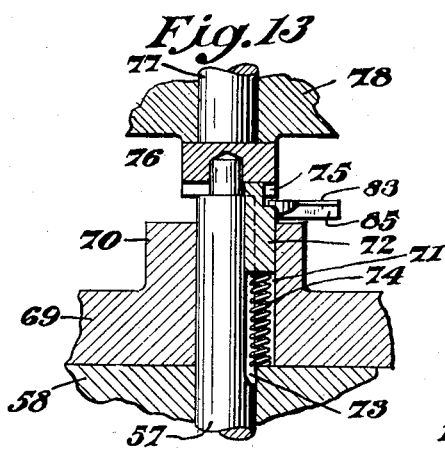
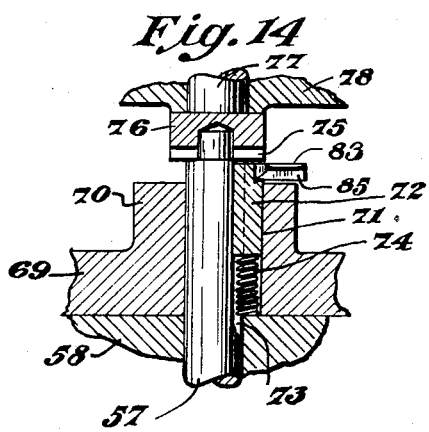
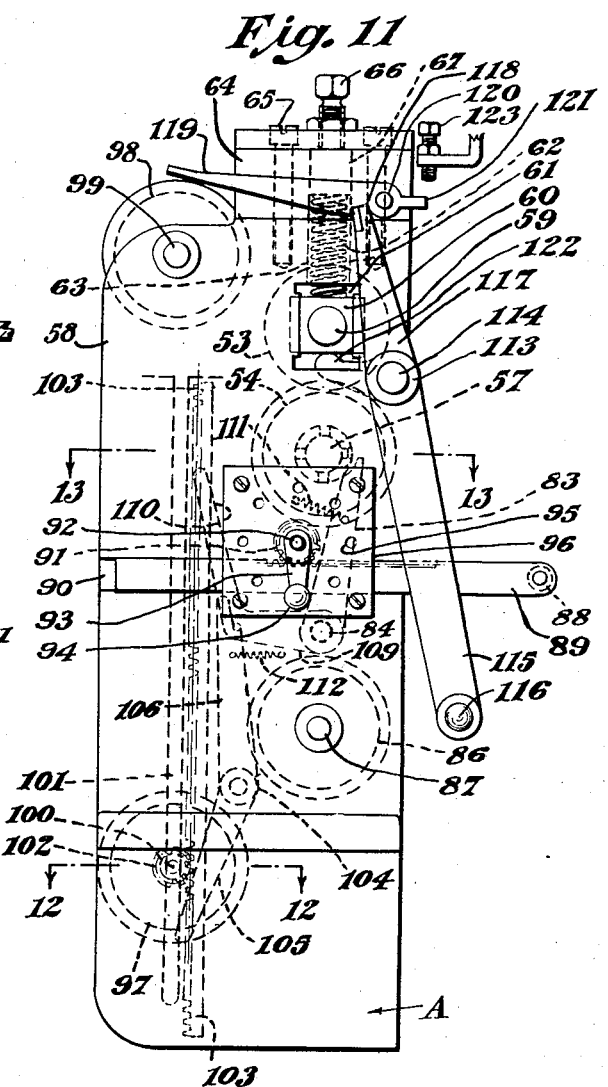

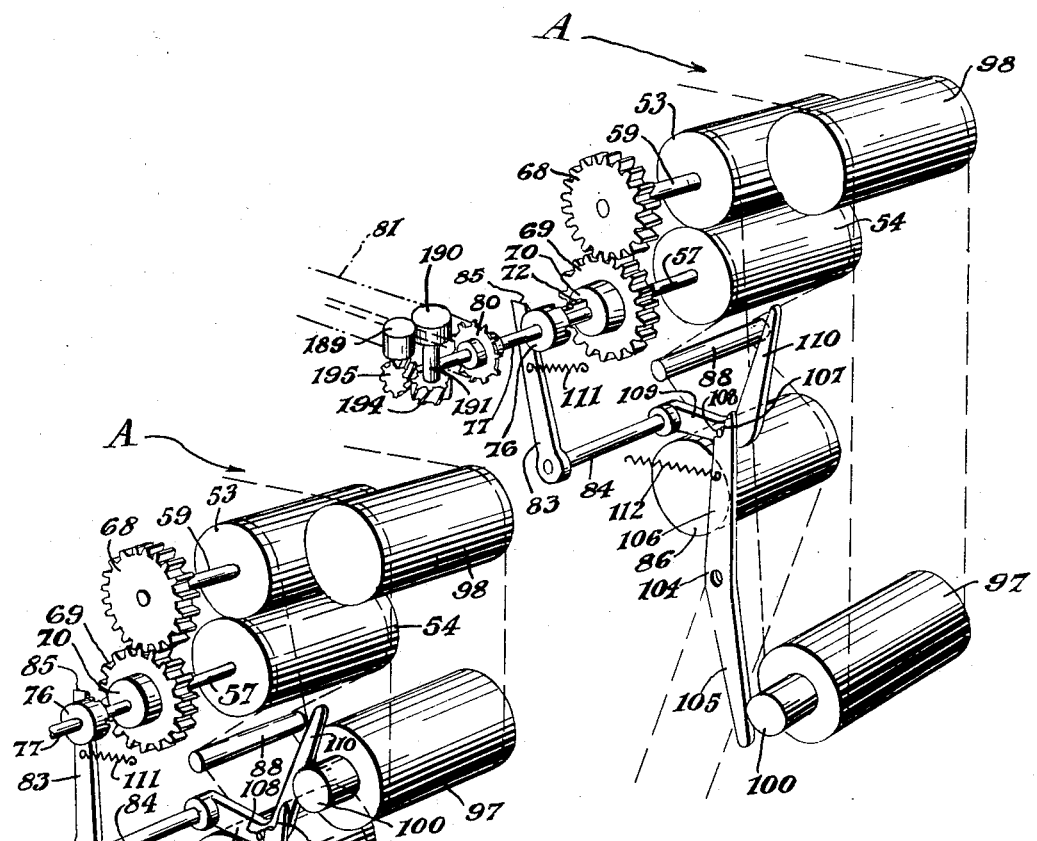

Nov. 28, 1933.  E. W. SIBLEY  1,937,327
METHOD AND APPARATUS FOR MAKING CARD HOLDING POCKETS
Filed Oct. 23, 1928    27 Sheets-Sheet 7

Inventor
Edward W. Sibley
by Barton A. Bean Jr.
Attorney

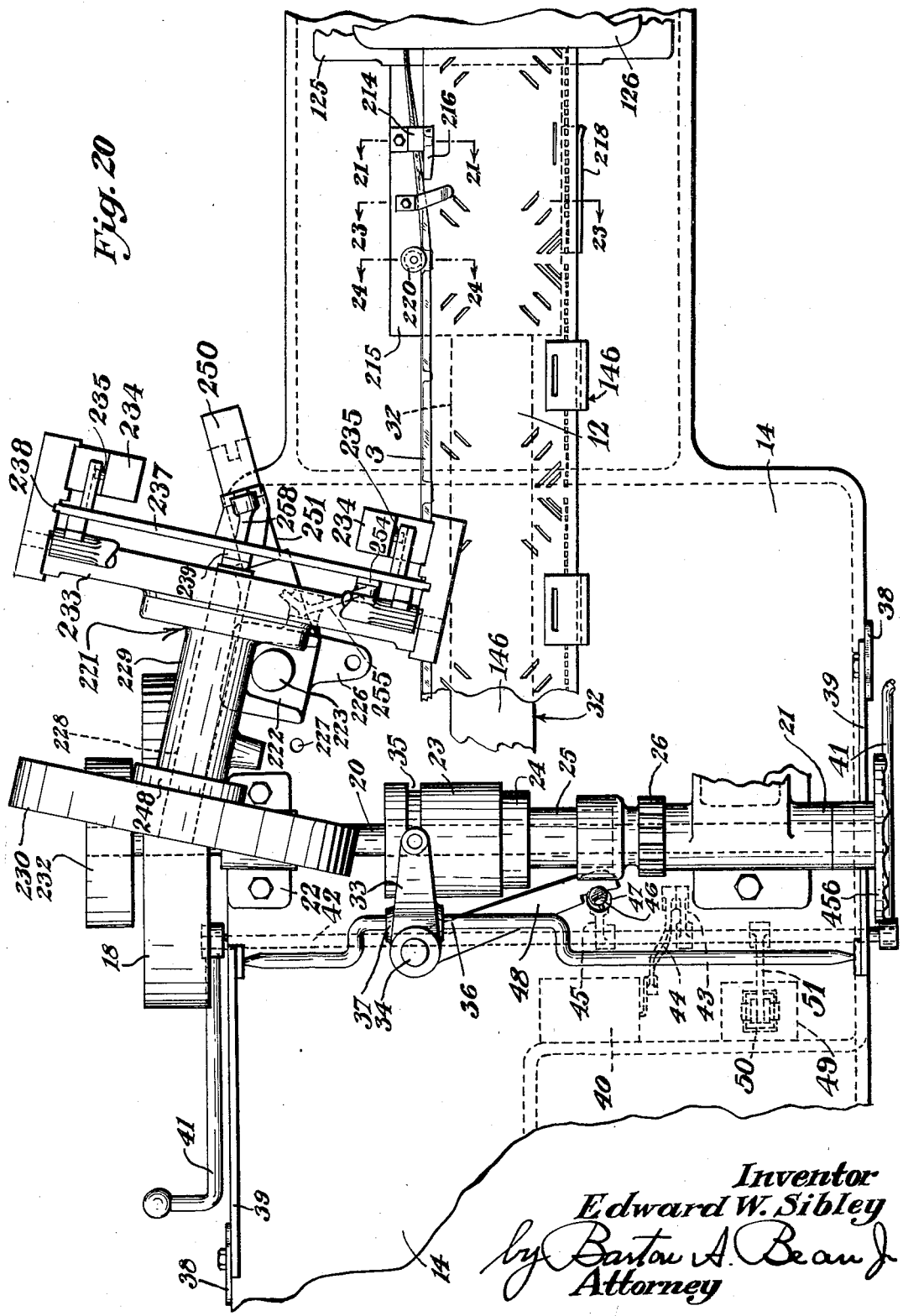

Nov. 28, 1933.  E. W. SIBLEY  1,937,327
METHOD AND APPARATUS FOR MAKING CARD HOLDING POCKETS
Filed Oct. 23, 1928  27 Sheets-Sheet 9
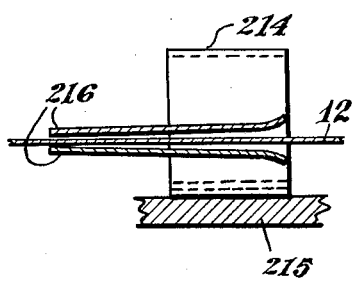
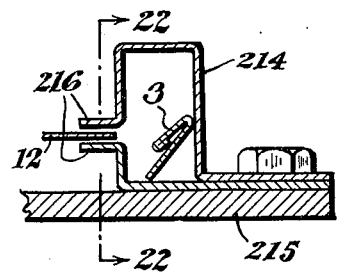
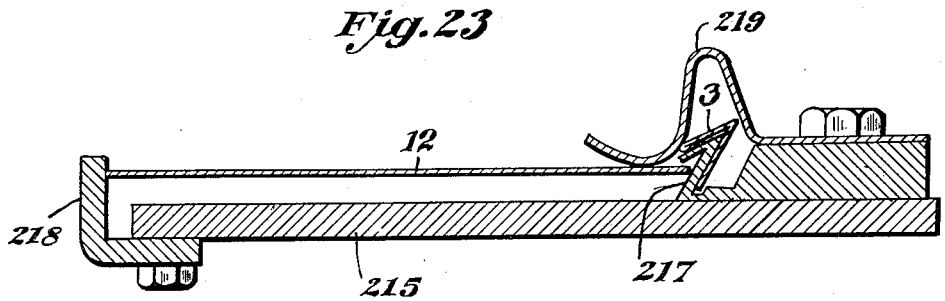
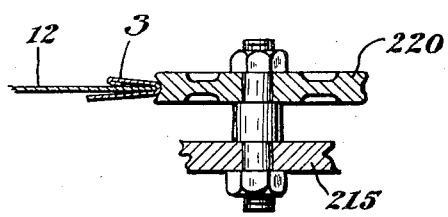
Inventor
Edward W. Sibley
by Barton A. Beau
Attorney Nov. 28, 1933. E. W. SIBLEY 1,937,327
METHOD AND APPARATUS FOR MAKING CARD HOLDING POCKETS
Filed Oct. 23, 1928 27 Sheets-Sheet 12

Inventor
Edward W. Sibley
by Barton A. Beard
Attorney

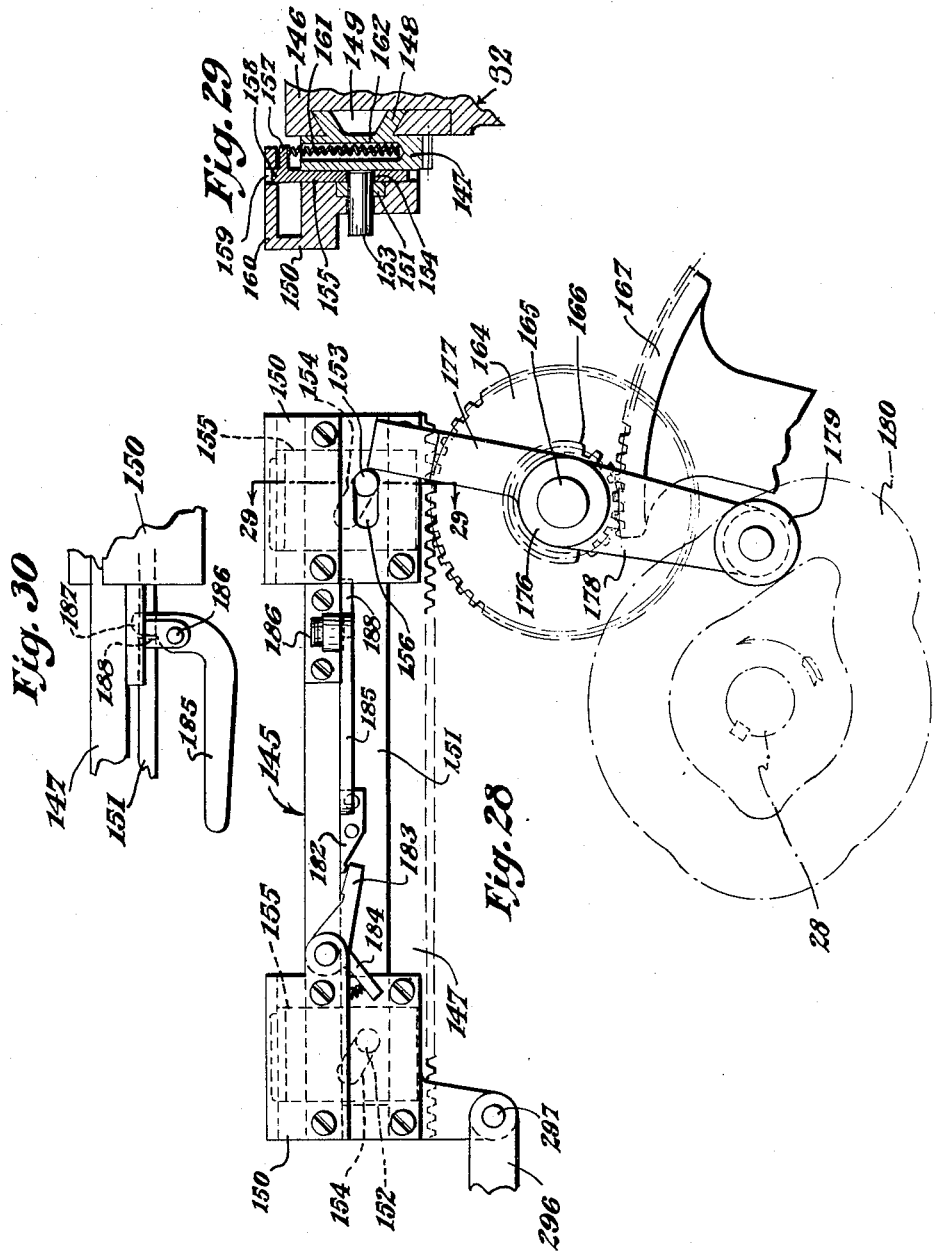

Nov. 28, 1933.  E. W. SIBLEY  1,937,327
METHOD AND APPARATUS FOR MAKING CARD HOLDING POCKETS
Filed Oct. 23, 1928   27 Sheets-Sheet 14
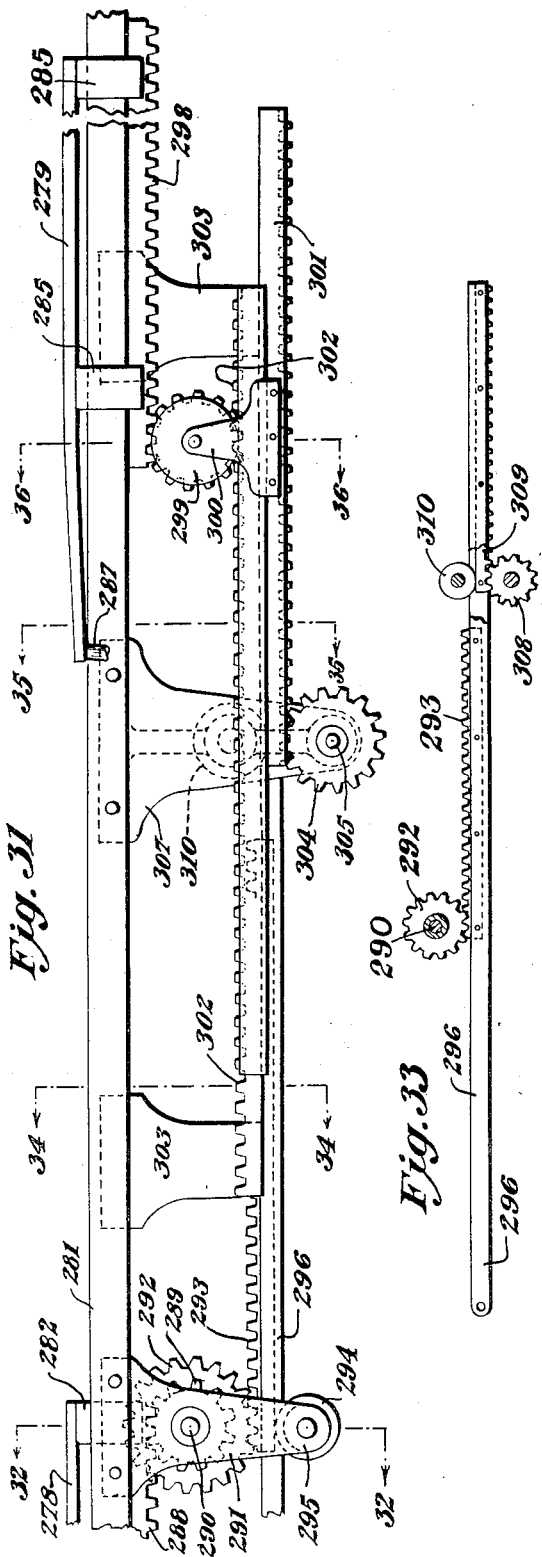
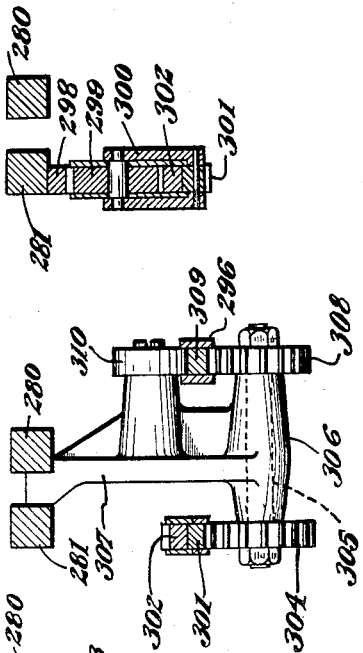
Inventor
Edward W. Sibley
by Barton A. Bean Jr
Attorney Nov. 28, 1933.   E. W. SIBLEY   1,937,327
METHOD AND APPARATUS FOR MAKING CARD HOLDING POCKETS
Filed Oct. 23, 1928   27 Sheets-Sheet 15
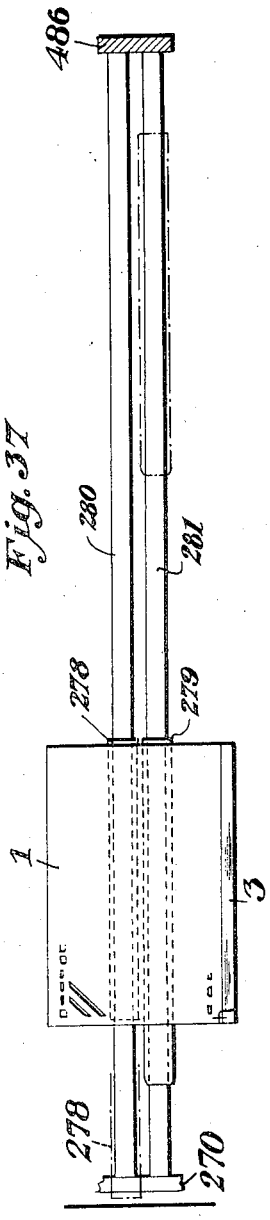
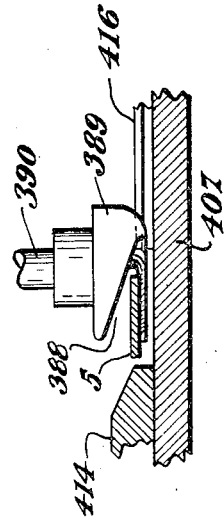
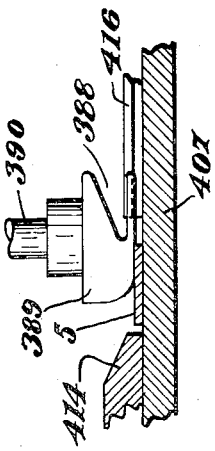
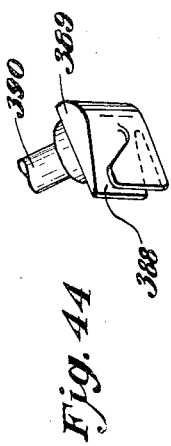
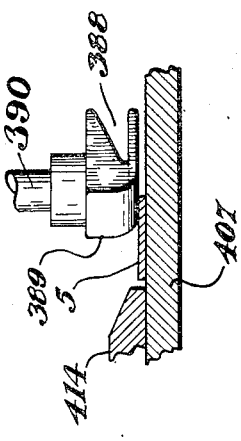
Inventor
Edward W. Sibley
by Barton A. Bean Jr
Attorney

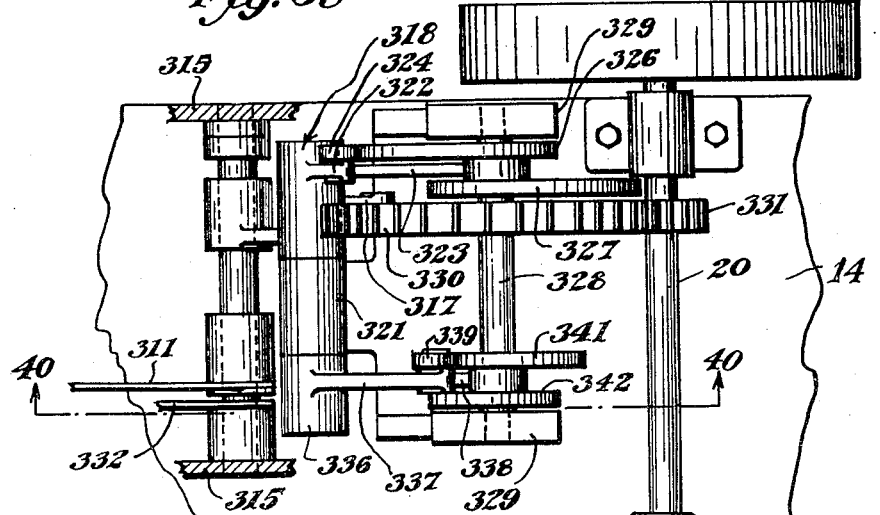
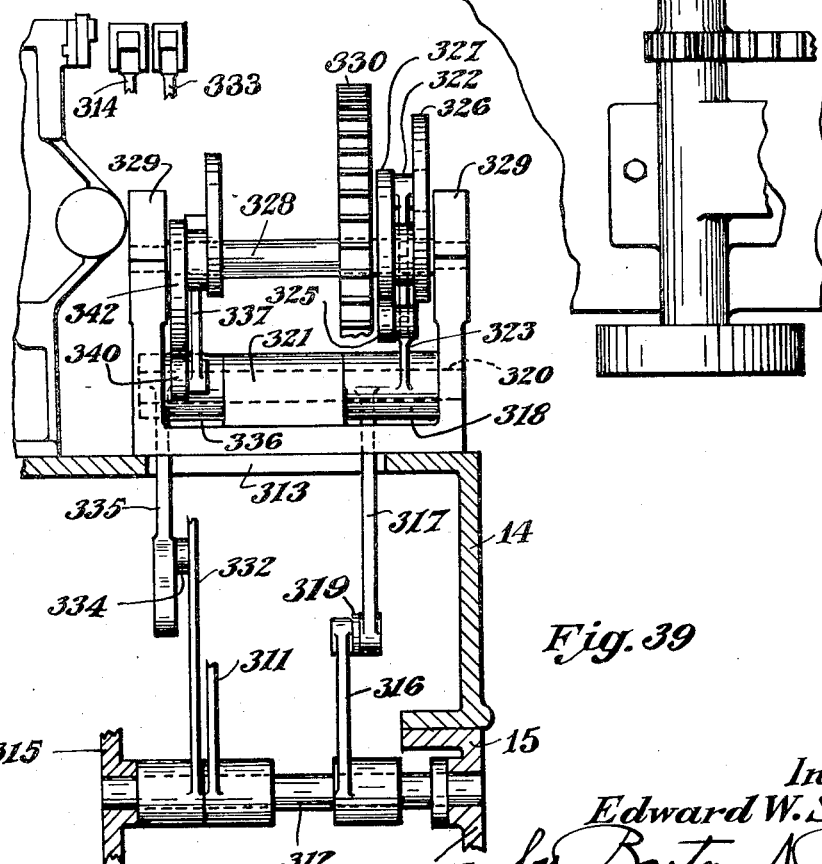

Nov. 28, 1933.   E. W. SIBLEY   1,937,327
METHOD AND APPARATUS FOR MAKING CARD HOLDING POCKETS
Filed Oct. 23, 1928   27 Sheets-Sheet 17

Inventor
Edward W. Sibley
by Barton A. Bean Jr.
Attorney

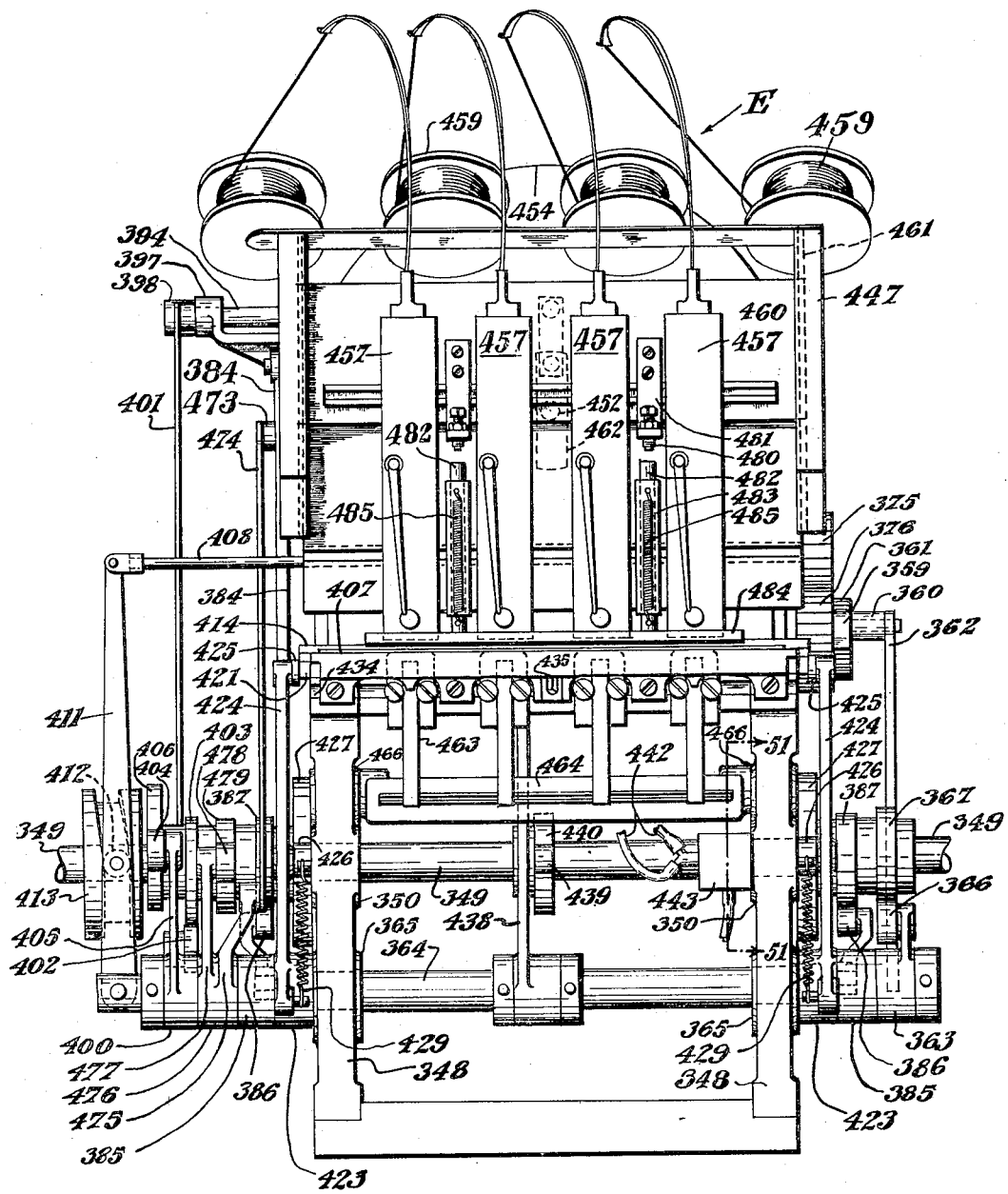

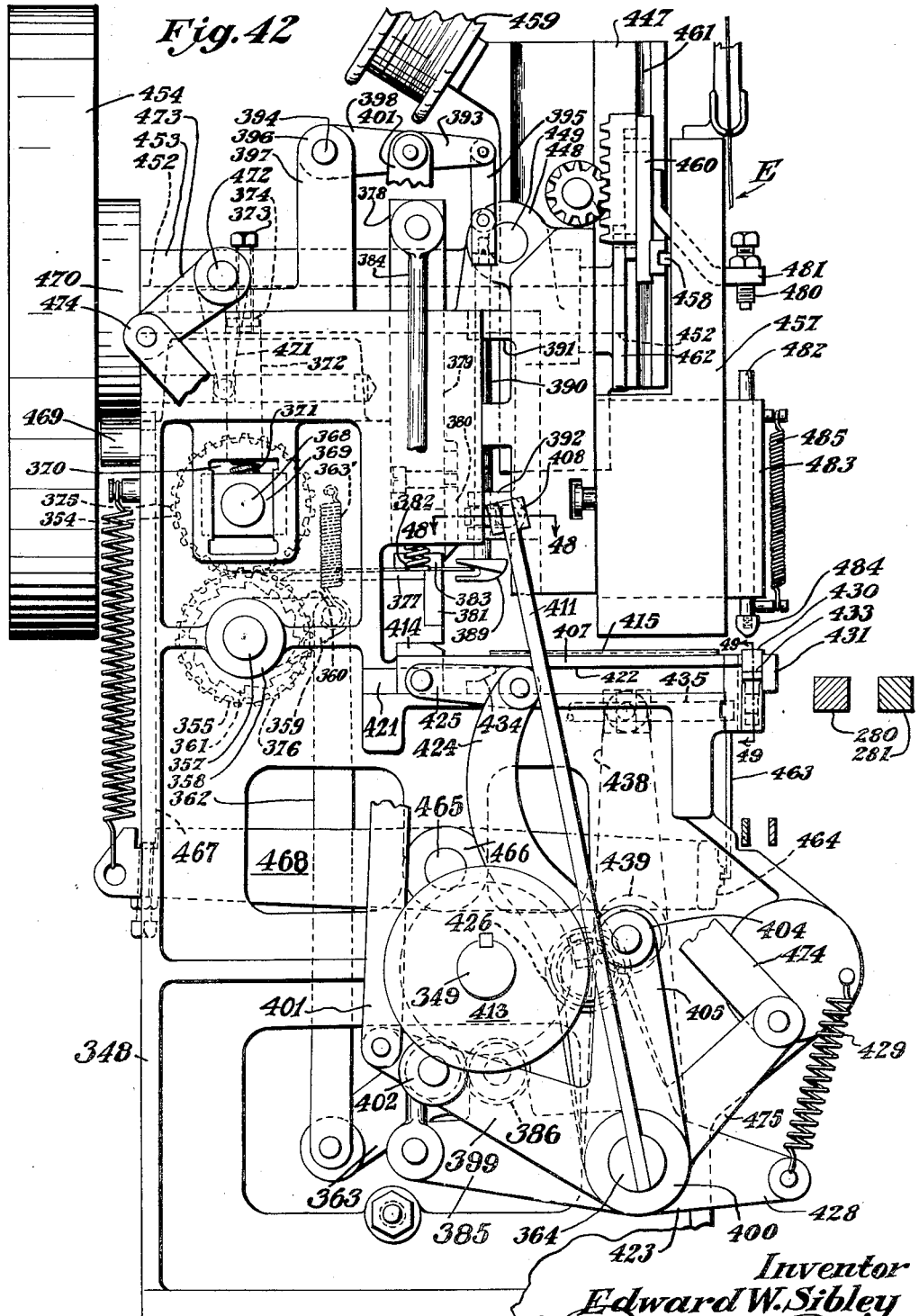

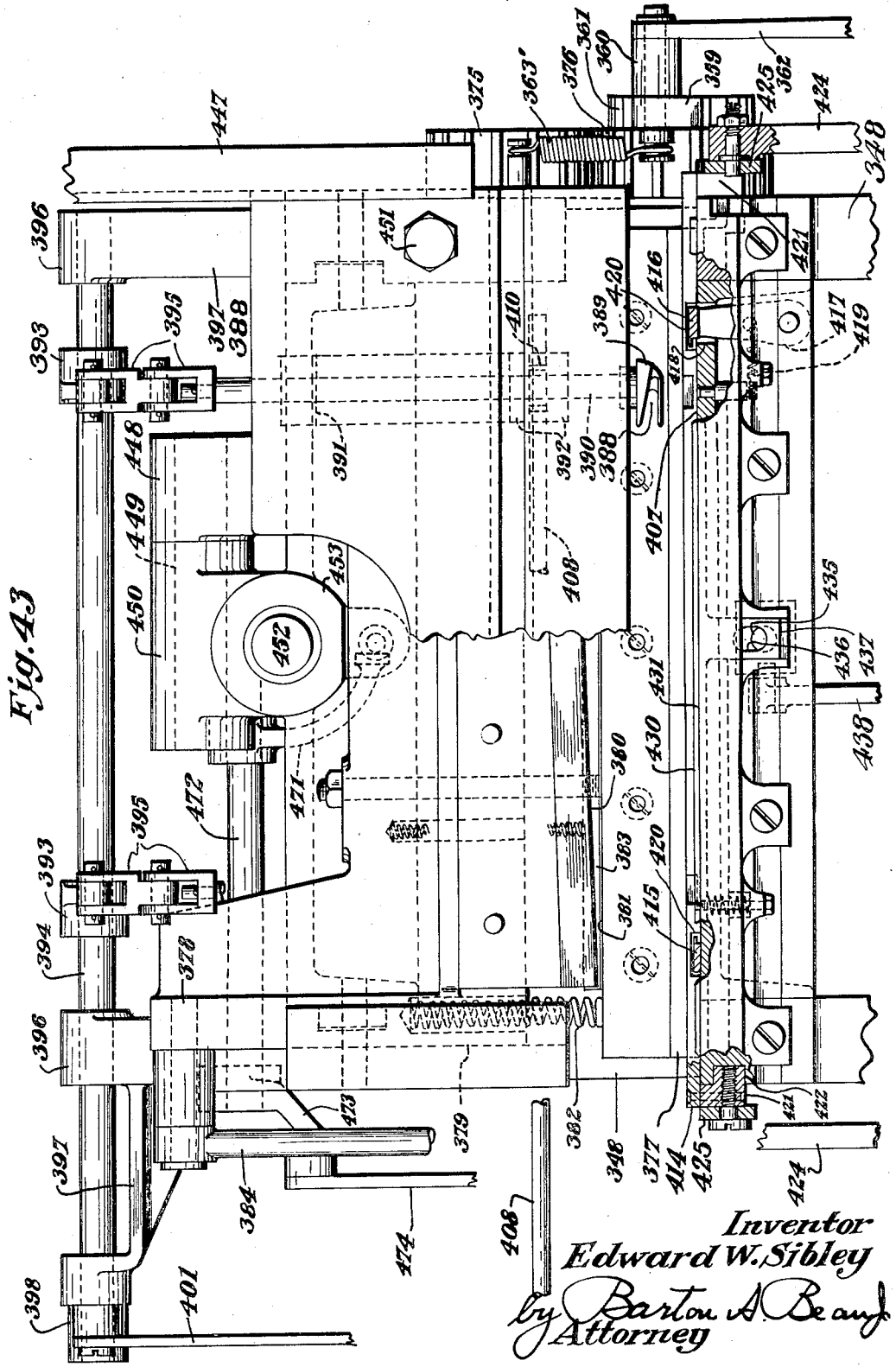

Nov. 28, 1933.   E. W. SIBLEY   1,937,327
METHOD AND APPARATUS FOR MAKING CARD HOLDING POCKETS
Filed Oct. 23, 1928   27 Sheets-Sheet 21
Fig. 48
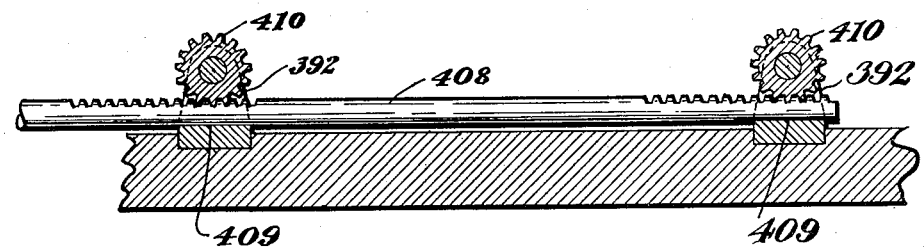
Fig. 49
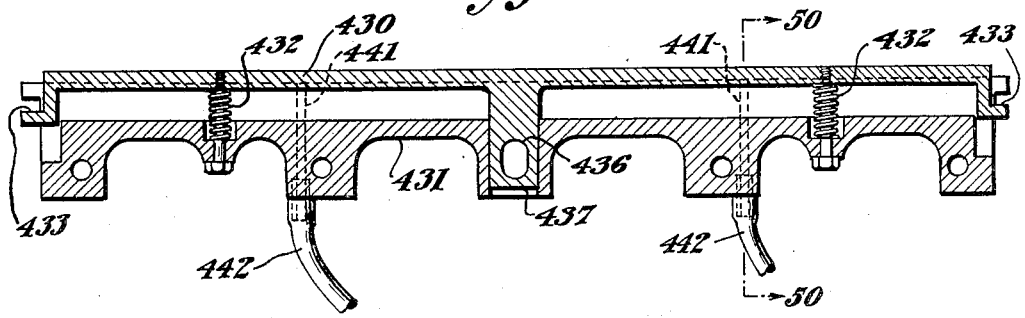
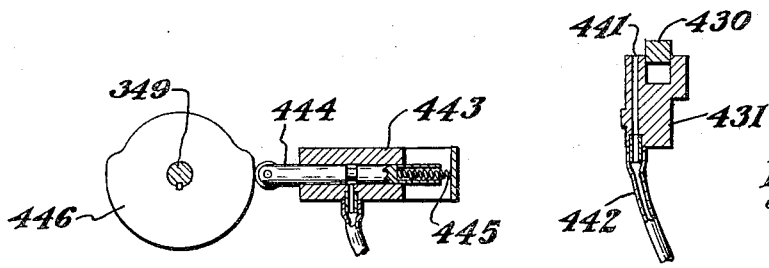
Fig. 50
Fig. 51
Inventor
Edward W. Sibley
by Barton A. Bean Jr.
Attorney Nov. 28, 1933.　　　E. W. SIBLEY　　　1,937,327
METHOD AND APPARATUS FOR MAKING CARD HOLDING POCKETS
Filed Oct. 23, 1928　　　27 Sheets-Sheet 24

Inventor
Edward W. Sibley
by Barton A. Beau Jr.
Attorney

Nov. 28, 1933.  E. W. SIBLEY  1,937,327

METHOD AND APPARATUS FOR MAKING CARD HOLDING POCKETS

Filed Oct. 23, 1928   27 Sheets-Sheet 25

Inventor
Edward W. Sibley
by Barton A. Beau
Attorney

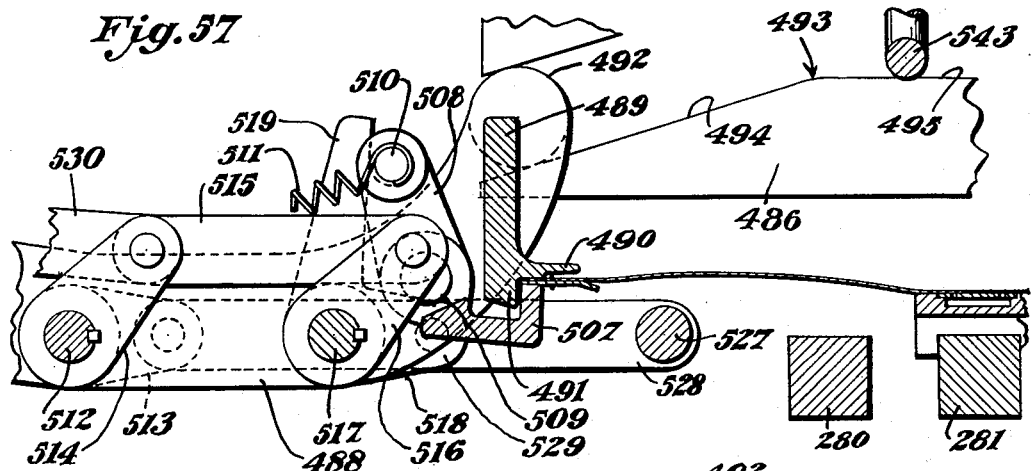
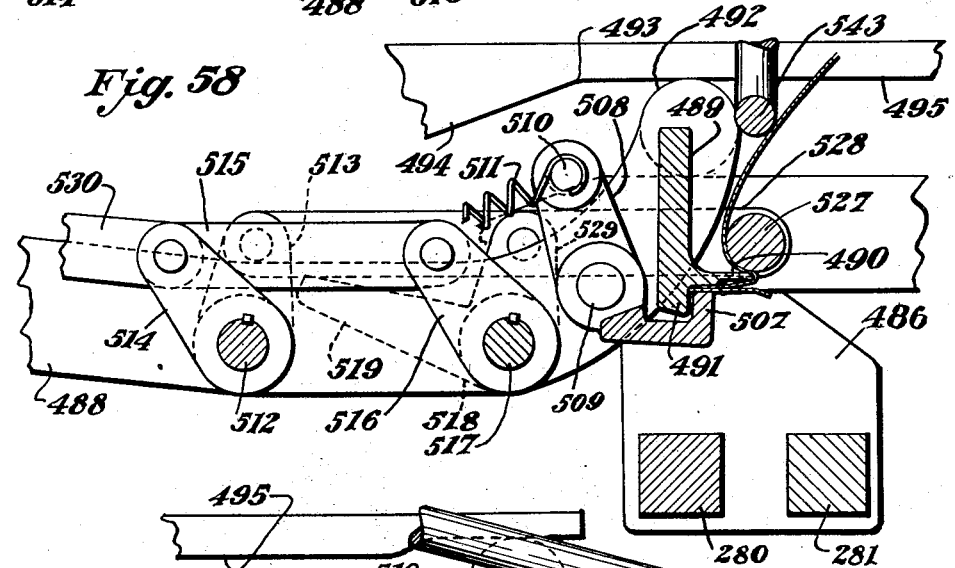
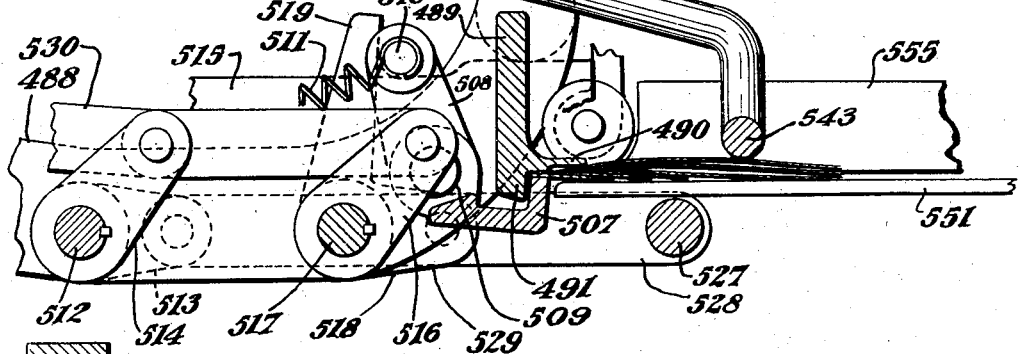

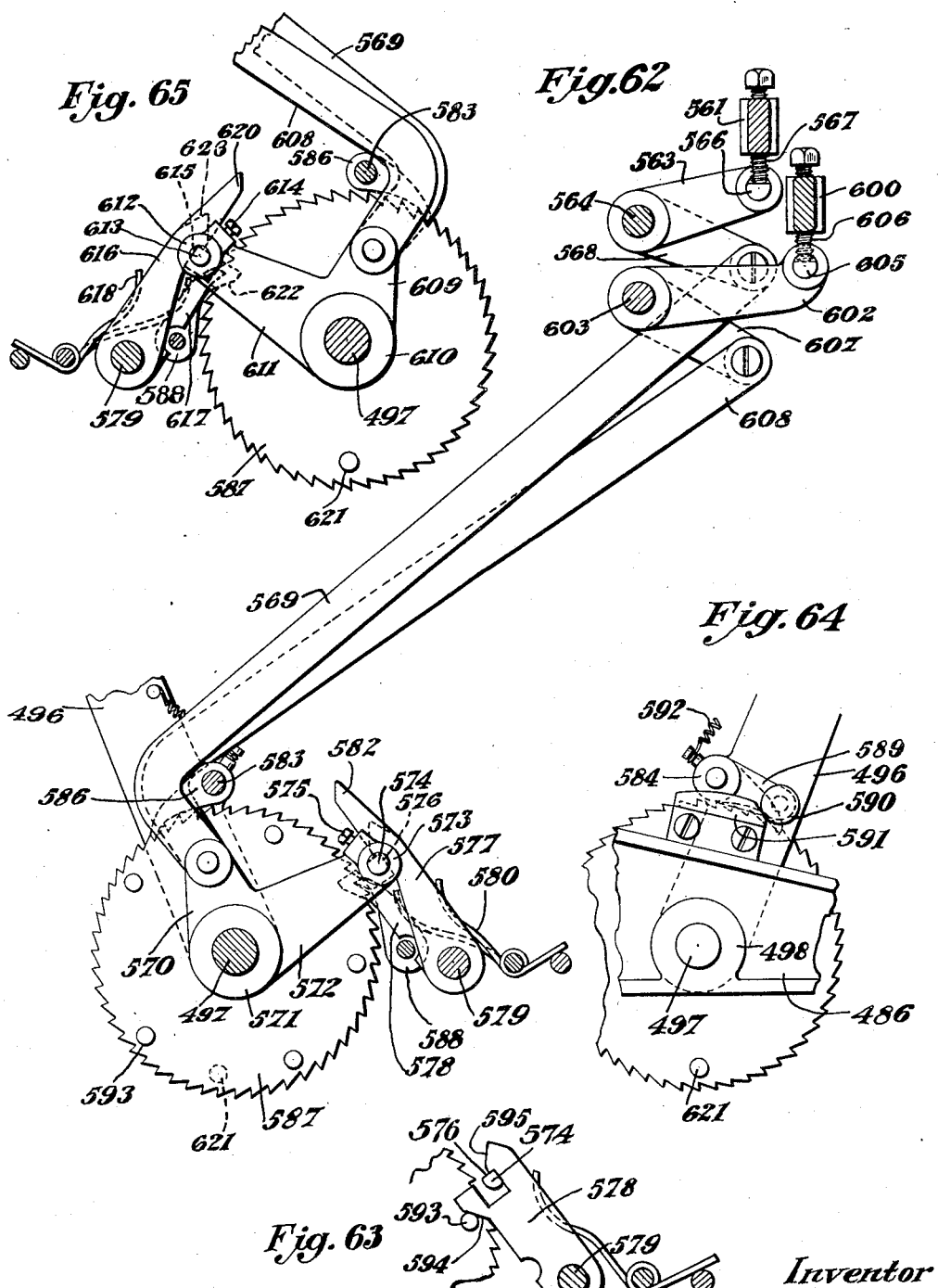

Patented Nov. 28, 1933

1,937,327

UNITED STATES PATENT OFFICE 1,937,327

METHOD AND APPARATUS FOR MAKING CARD HOLDING POCKETS

Edward W. Sibley, Kenmore, N. Y., assignor to Remington Rand Inc., Buffalo, N. Y.

Application October 23, 1928. Serial No. 314,379

58 Claims. (Cl. 93—1)

The invention relates to a method of and apparatus for making card holders or pockets for use in visible index and filing systems and more particularly to card holders, such as the Kardex pockets shown in Letters Patent No. 1,603,406, granted to James H. Rand, Jr., and adapted to be arranged in a tray or drawer in overlapping, stepped relation.

One of the objects of the present invention is to provide a method of and apparatus for making card holders of the character described by means of which the rate of production and accuracy of construction of the holder is materially increased and the amount of waste heretofore encountered reduced to a minimum and which comprises intermittently feeding a strip of paper through a series of instrumentalities which successively punches the paper to provide the hinged portions of the pockets and the card retaining apertures therein, feeding a strip of celluloid onto an edge of the paper and attaching it thereto, cutting the paper and attached celluloid into desired lengths, attaching a fibrous strip to the opposite edge of the severed length of paper to form the retaining and spacing member of the pocket, and folding the pockets along the hinged portion thereof and nesting the pockets thus formed in groups of predetermined number.

Another object of the invention is to provide a machine of the character described capable of automatically performing all of the operations of fabricating Kardex pockets heretofore performed manually, in timed relation to one another and in which certain operations are performed on one portion of the strip during the time that certain other operations are being performed on other portions of the strip in a predetermined cycle order, thus increasing the rate of production of the machine.

Another object of the invention is to provide a machine of the character described in which means are provided for feeding the paper continuously from a supply roll and translating such continuous motion of the paper into an intermittent motion to permit it to be operated on by the several fabricating units of the apparatus.

Another object of the invention is to provide means for folding the pockets subsequent to their assembly and to arrange them in nested relation in groups of predetermined number and ready to be arranged in a filing tray or the like.

Another object of the invention is to provide a machine of the character described provided with safety shut off devices for discontinuing the operation of the machine in the event of the abnormal operation thereof.

Other objects will appear from the following description and the appended claims.

In the accompanying drawings,

Fig. 1 is a plan view of a Kardex pocket constructed in accordance with the method which is one of the objects of the invention.

Fig. 2 is a transverse sectional view taken on line 2—2 of Fig. 1.

Fig. 3 is a diagrammatic plan view illustrating the successive steps in the present method of making Kardex pockets.

Fig. 4 is a plan view of a section of paper strip after the perforating operation, but before the celluloid sheaths and spacing and retaining strips have been attached thereto and before it has been separated into individual pockets of the desired length.

Fig. 5 is a fragmentary plan view of a celluloid sheath before it is attached to the strip of paper.

Fig. 6 is a transverse sectional view on a larger scale through the celluloid sheath shown in Fig. 5.

Fig. 7 is a plan view of a strip of flexible material subsequent to its separation from a parent body of such material and prior to its attachment to a card holder.

Fig. 8 is a transverse sectional view through the strip shown in Fig. 7.

Fig. 9 is a front elevational view of a machine constructed and designed to manufacture and assemble Kardex pockets according to the present method of manufacturing.

Fig. 10 is a view on a larger scale of the feeding end of the structure shown in Fig. 9.

Fig. 11 is a detail side elevation of the feed roll unit taken from the rear side of the machine.

Fig. 12 is a fragmentary sectional view on a larger scale of the slack take-up roll taken on line 12—12 of Fig. 11.

Figs. 13 and 14 are similar views taken on line 13—13 of Fig. 11 and illustrating the clutch mechanism of the feed roll in engaged and disengaged positions, respectively.

Fig. 15 is a diagrammatic view showing the relative position of the rolls of the paper feed unit when the slack in the paper strip is at its maximum.

Fig. 16 is a similar view showing the position of the take-up roll when the slack in the paper is substantially at its minimum.

Fig. 20 is a plan view of a portion of the machine, with parts removed, illustrating the tip stitching mechanism swung to an inoperative position to permit access to the stitching mechanism.

Fig. 21 is an enlarged transverse sectional view taken on line 21—21 of Fig. 20 and illustrating the tip applying mechanism.

Fig. 22 is a vertical sectional view taken on line 22—22 of Fig. 21.

Fig. 23 is a similar view taken on line 23—23 of Fig. 20.

Fig. 24 is a similar view taken on line 24—24 of Fig. 20.

Fig. 28 is an enlarged front elevational view of the paper feed carriage mechanism.

Fig. 29 is a vertical detail sectional view taken on line 29—29 of Fig. 28.

Fig. 30 is a plan view of a portion of the structure shown in Fig. 28.

Fig. 31 is a detail side elevational view of the pocket transfer mechanism.

Fig. 32 is a sectional view taken on line 32—32 of Fig. 31.

Fig. 33 is a transverse sectional view taken on line 33—33 of Fig. 32.

Fig. 34 is a transverse sectional view taken on line 34—34 of Fig. 31.

Fig. 35 is a similar view taken on line 35—35 of Fig. 31.

Fig. 36 is a similar view taken on line 36—36 of Fig. 31.

Fig. 37 is a diagrammatic plan view of the suction pocket transfer mechanism.

Fig. 38 is a plan view of another form of mechanism for operating the pocket transferring devices.

Fig. 39 is an end elevational view looking from the right of the structure shown in Fig. 38.

Fig. 41 is an elevational view of the lug or spacing and retaining strip attaching unit taken from the rear of the machine.

Fig. 42 is an end elevational view of the lug attaching unit illustrated in Fig. 41 and taken from the feed end of the machine.

Fig. 43 is an enlarged rear elevational view of the upper portion of the lug attaching unit illustrated in Fig. 41 with parts removed.

Fig. 44 is a perspective view of one of the lug lowering elements.

Figs. 45, 46 and 47 are detail views illustrating different positions occupied by one of the lug lowering and retaining elements.

Fig. 48 is a horizontal sectional view of the mechanism for operating the lug lowering elements and taken on line 48—48 of Fig. 42.

Fig. 49 is a vertical sectional view taken on line 49—49 of Fig. 42 and illustrating the mechanism for ejecting the pocket from the lug stitching and off-setting mechanism.

Fig. 50 is a sectional view on line 50—50 of Fig. 49 and illustrating the suction ports for holding the lug down during the stitching and off-setting operations.

Fig. 51 is a detail sectional view taken on line 51—51 of Fig. 41 and illustrating the suction control valve.

Figs. 56, 57, 58 and 59 are transverse sectional views on a larger scale taken on line 56—56 of Fig. 53 and illustrating different positions occupied by the pocket creasing and stacking mechanism.

Fig. 62 is a detail sectional view taken on line 62—62 of Fig. 53 illustrating the mechanism for operating the pocket delivering mechanism of the stacking unit.

Fig. 63 is a fragmentary view illustrating more in detail part of the structure shown in Fig. 62.

Fig. 64 is a fragmentary end view taken from the opposite side of the structure shown in Fig. 62.

Fig. 65 is a detailed sectional view taken on line 65—65 of Fig. 53.

*Pocket structure*

Figure 17:
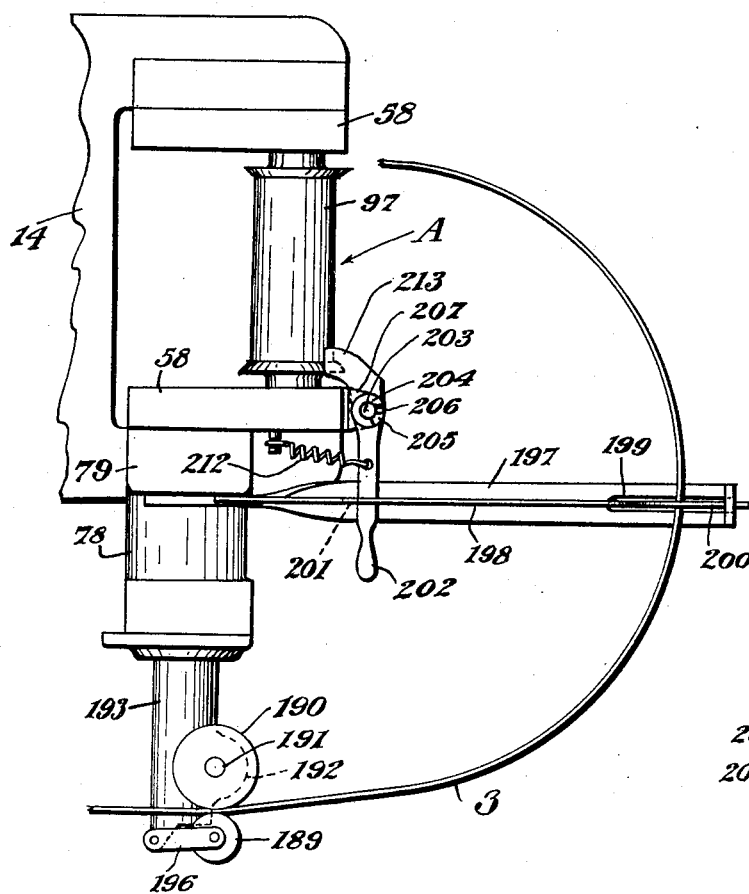
Fig. 17 is a plan view, with parts removed, of the feed roll unit and illustrating the mechanism for automatically discontinuing the operation of the machine in the event that the feed of the celluloid sheath or tip falls behind or lags the speed of operation of the machine.

With particular reference to Fig. 1 of the drawings, a Kardex pocket, such as that described in Letters Patent No. 1,603,406 granted to James H. Rand, jr., is illustrated as comprising a body portion 1 which is provided with a plurality of diagonally disposed card retaining perforations 2 adjacent to each corner thereof. A strip 3 of transparent celluloid is folded upon itself and is attached to the lower edge of the body portion 1 by means of staples 4 and forms a pocket to receive the lower edge of a record card or the like. A strip 5 of flexible material is attached to the upper edge of the body portion 1 by means of staples 6. The ends of this strip extend beyond the side edges of the body portion 1 of the pocket and provide lugs 7 for engagement with the retaining flange of an index or record tray not shown. The body portion 1 of the pocket is also provided with a series of spaced apertures 8 along the upper edge of the pocket adjacent to the retaining strip 5 and with another series of spaced apertures 9 along the lower edge of the pocket adjacent to the celluloid strip 3. These apertures provide weakened lines along which the pocket may be bent to provide hinges for examining the exposed sides of the cards carried by the pockets disposed therebeneath or the opposite side of the card carried thereby and also a card mounted on the reverse side thereof.

The retaining strip 5 is bent slightly to provide an offset 10, (Fig. 2), within which the upper edge of the corresponding strip of the next adjacent pocket is adapted to nest. The strip 5 not only functions as a base upon which the pocket is hinged and as a means for detachable engagement with the filing tray, but together with the adjacent strips also acts as a spacing element so that the pockets overlie each other in stepped relation, thus rendering visible through the celluload strip 3 the subject matter written or printed on the extreme lower edge of the next adjacent card. An elongated card retaining aperture 11 is also provided in the body portion 1 of the pocket adjacent to the upper edge thereof and is adapted to be engaged by an ear formed on a record card when the pocket is employed in card posting systems. In the present invention this aperture is adapted to be engaged by a reciprocating lug for intermittently feeding the paper through the machine as will be hereafter described.

Method of manufacture

According to the present method of manufacturing Kardex pockets, a strip of paper 12 is intermittently fed between a pair of cooperating die members located at a punching station where the several apertures hereinbefore referred to are punched in the paper, so that the strip then appears as shown in Fig. 4, the dash lines 1' indicating division between successively punched portions of the strip 12. The paper strips so punched are then fed to a tip or sheath applying station where the celluloid strip 3 is fed into engagement with one edge of the paper (Figs. 20 to 24), from a device 13 which is designed to fold the celluloid upon itself and which constitutes no part of the present invention. The strip of paper carrying the celluloid sheath is next fed to a station (unit C) where the sheath is attached to the paper by means of a stapling device of any desired commercial type, so that the three staples 4 are applied in the manner shown in Fig. 1, the center one being inserted and applied from the opposite side from those at the ends.

The strip of paper and the attached celluloid strip is next fed to a separating station where the paper and attached sheath are cut into desired lengths the paper being severed along the line 1' indicated in Fig. 4. The sections of paper are then engaged by transfer mechanism and moved to a lug applying station where the flexible strip 5, which has been previously severed from a parent strip of such material, is secured to the opposite edge of the paper by means of another stapling mechanism of suitable commercial design. Four wire stitches 6 are here applied which are in aligned relation as shown in Fig. 1. The completed pocket is then engaged by another transfer mechanism and fed to a folding and stacking mechanism which bends the pockets along the apertures 8 and nests them in groups of predetermined number (Figs. 56 to 59), ready to be assembled in the trays of a filing device.

It will be noted from the foregoing that according to the present method of manufacturing Kardex pockets, certain of the operations are performed on certain portions of the paper during the time that certain other operations are being performed on certain other portions of the paper. For example, a portion of the sheet is being punched at the same time that other portions of the sheet that have been previously punched are having the celluloid sheath positioned thereon, stitched thereto, separated into desired lengths, having the spacing and retaining member 5 attached thereto, and being nested and stacked for subsequent assembly in the filing device. This overlapping cycle of operations renders it possible to materially increase the rate of production of the machine and the accuracy of construction of the pockets produced thereby.

Main driving mechanism

Figure 25:
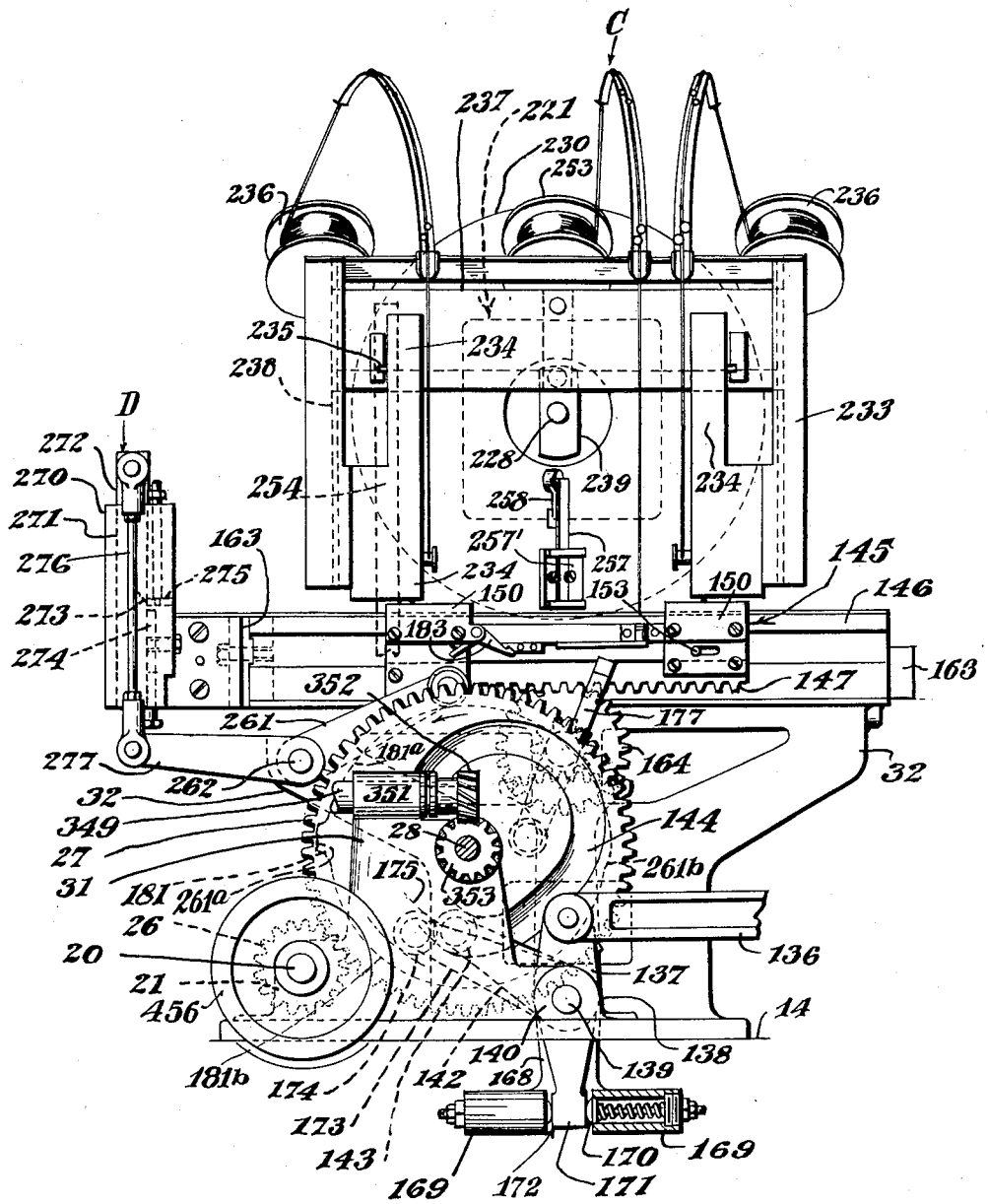
Fig. 25 is a fragmentary front elevational view of part of the machine and illustrating the tip stitching mechanism and the driving mechanism.
Figure 26:
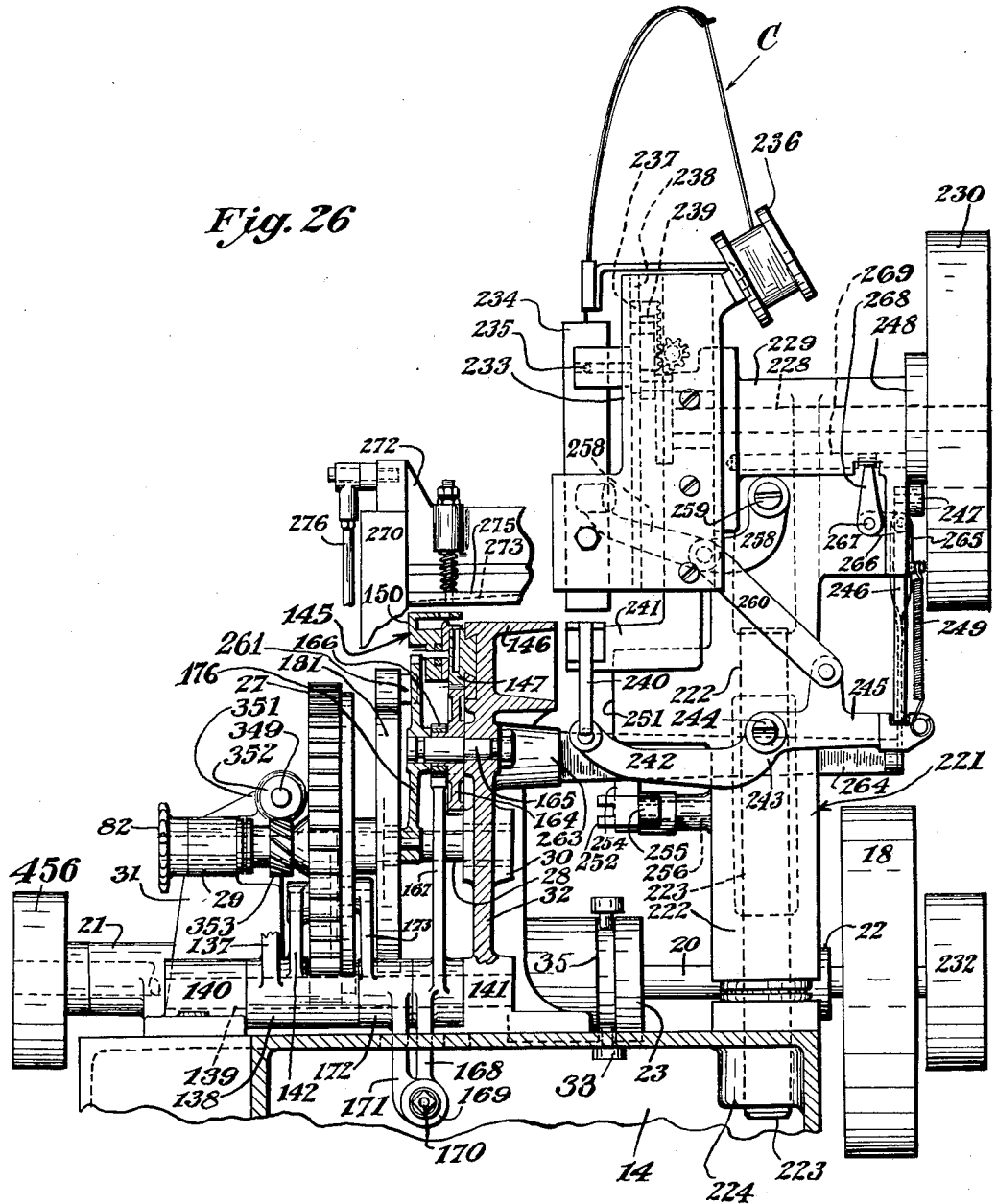
Fig. 26 is a view partly in end elevation and partly in vertical section, of the stitching and driving mechanism.

The machine designed to carry out the above described method briefly comprises a paper feed regulating unit A; a punching unit B; a tip or sheath attaching unit C; a separating unit D; a spacing and retaining member attaching unit E; and a nesting and stacking unit F, (Fig. 9). All of these units are mounted on a bed 14 which is carried by a supporting housing 15 and are driven in timed relation with respect to each other by an electric motor 16. This motor is mounted in the housing 15 and is provided with a pulley 17 which drives a pulley 18 through the medium of a belt 19, (Fig. 10). The pulley 18 is fixed to one end of a main drive shaft 20 which is mounted in bearings 21 and 22 carried by the bed 14 of the machine (Figs. 10, 20 and 26). A clutch member 23 is mounted in any suitable manner on the shaft 20 (Figs. 20 and 26), for rotation therewith and also for axial sliding movement relative thereto. This member 23 is adapted to engage a coacting clutch member 24 which is fixed to one end of a sleeve 25. This sleeve is mounted on the shaft 20 for free relative rotation and is provided with a pinion 26 at the other end thereof for driving engagement with a gear wheel 27 (Figs. 9, 25 and 26), which is fixed to a parallel extending jack shaft 28. This shaft is journalled in bearings 29 and 30 formed in the brackets 31 and 32 also carried by the bed 14 (Figs. 25 and 26) and drives all of the mechanism of the machine except the sheath and lug attaching units C and E.

The clutch member 23 (Figs. 20 and 26), may be moved longitudinally on the shaft 20 in order to establish or de-establish driving engagement between this shaft and the jack shaft 28 by means of a yoke lever 33 which is pivotally mounted on a stud 34 carried by the bed 14 and which engages a circumferential groove 35 formed in the clutch member 23. This yoke is swung about its pivot by means of a bar 36 (Fig. 20), which is fixed in a boss 37 formed in the yoke and which extends entirely across the machine. The bar 36 extends in opposite directions from yoke 33 over bed 14 and has the ends terminating adjacent the sides of bed 14. Links 39 (Figs. 20 and 27) pivotally connect the ends of bar 36 with levers 38 adjacent the upper ends, the lower ends of levers 38 being pivotally mounted on the sides of bed 14 in positions at opposite sides of the machine accessible and convenient to the operator of the machine. By manually operating either lever 38, the bar 36 may be moved in a plane parallel to bed 14 and with it yoke 33 about stud 34 as a center, to shift clutch member 23 into or cut of engaged relation with clutch member 24.

The electric motor 16 may be connected to or disconnected from its source of current by means of a knife switch 40 (Fig. 27) which is actuated by hand levers 41. These levers 41 are fixed to each end of a shaft 42 which extends beneath the bed 14 and is journalled in the sides thereof. A lever 43 is also fixed to the shaft 42 and is pivotally connected to the switch 40 by means of a link 44. The shaft 42 also carries a lever 45 pivotally connected at its outer end to a pin 46 extending upwardly through an aperture 47 provided in the bed 14. This pin is provided with a notch 46' in its upper end and is adapted to be urged to the left, as viewed in Fig. 27, by a spring 47' carried thereby for engagement with the side of the aperture 47. When the shaft 42 is rotated to open the switch 40, to discontinue the operation of the machine, the pin 46 is elevated to a point where the notch 46' in the end thereof engages the edge of a lever 48 (Fig. 20), which is fixed to the yoke lever 33 and which overlies the aperture 47 when the clutch elements are in driving relation to each other. This construction prevents the switch 40 from being again closed to start the machine as long as the clutch is in engagement and renders it necessary, in starting the machine, to first actuate the yoke 33 to disengage the clutch elements and to withdraw the lever 48 from engagement with the notch 46' in the pin 46 before the switch 40 can be closed, thus allowing ample time for the motor to obtain the proper speed before subjecting it to the load imposed by the various mechanism.

Figure 27:
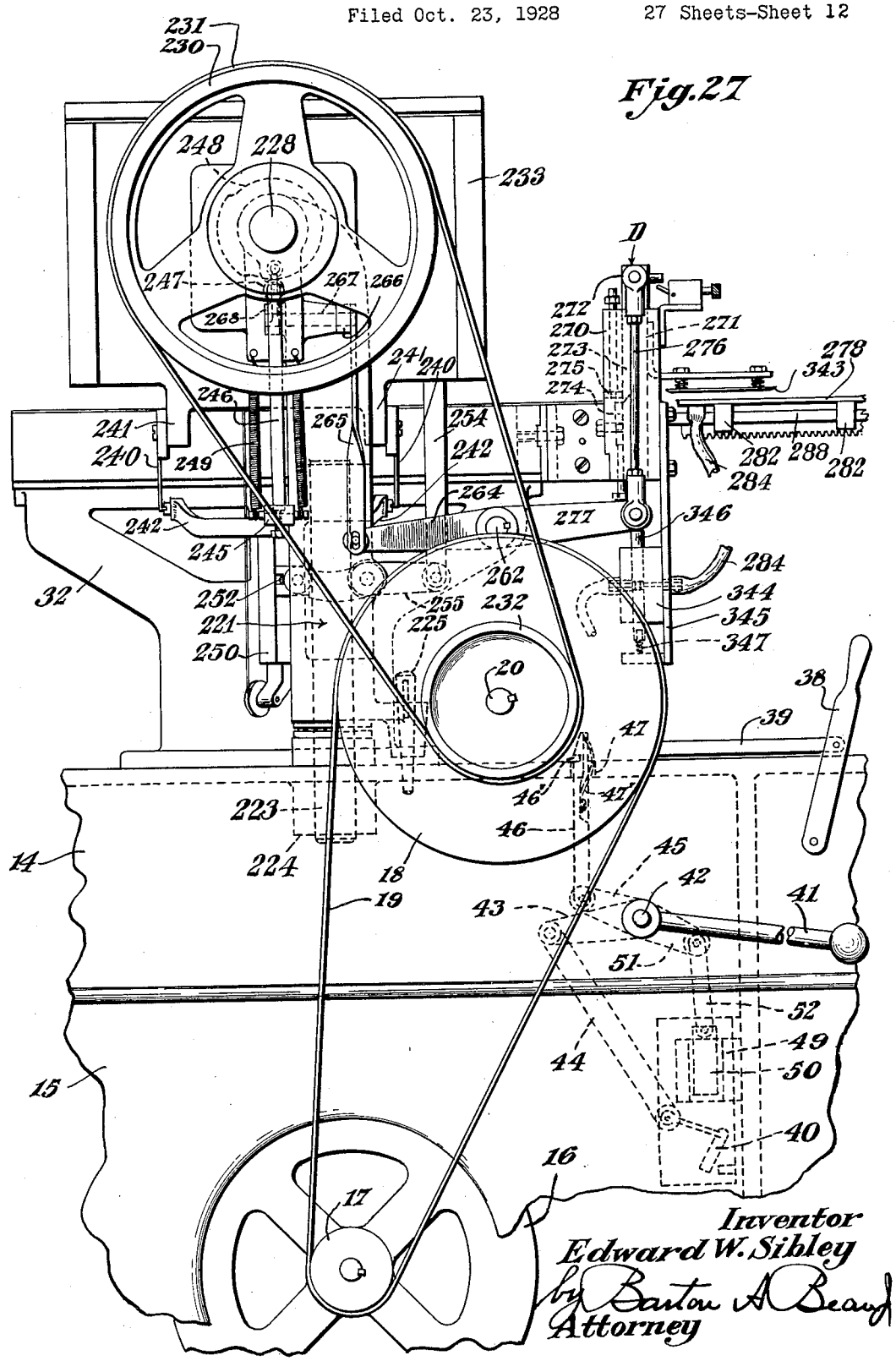
Fig. 27 is a fragmentary view on a larger scale taken from the rear of the machine and illustrating the driving mechanism and the relative position of the tip stitching and paper cut-off instrumentalities.

The switch 40 may also be opened to stop the machine in the event of the abnormal operation of certain parts, hereinafter described, through the instrumentality of an electromagnet 49, (Fig. 27). This magnet is provided with the usual armature 50 which is connected to an arm 51 fixed to the shaft 42, by a link 52. In the event that the magnet 49 is energized through certain safety shut-off mechanisms to be described, the armature 50 will descend and rock the shaft 42 thus opening the switch 40.

The operation of armature 50 to open the switch in rocking shaft 42 also projects pin 46 upwardly so that notch 46' will ride into position over lever 48 and lock the parts in this position, making it necessary to operate lever 38 to disengage the clutch elements before again starting the motor.

It will be noted in Fig. 20 that bar 36 is rigidly mounted in yoke 33 and swings in a horizontal plane about stud 34 as a pivot when either of the levers 38 are operated to either engage or disengage the clutch elements.

*Paper feeding unit*

The paper feeding unit A embodies a pair of upper and lower pinch rolls 53 and 54, (Figs. 10, 11, 15 and 16), which are adapted to rotate at the same peripheral speed and to draw a strip of paper from a supply roll 55 (Figs. 9 and 10), which is rotatably mounted on a spindle 56 carried by the housing 15.

The lower roll 54 is fixed to a shaft 57 (Figs. 11, 15 and 16), which is journalled in side plates 58 (Figs. 9, 10, 11 and 17), carried by the bed 14 and is driven by mechanism presently to be described. The upper roll 53 is fixed to a shaft 59 which is journalled in floating bearing blocks 60 (Fig. 11) which are mounted for vertical sliding movement in slots 61 provided in the side plates 58. The upper roll 53 is resiliently urged toward the roll 54 in order to yieldably grip the strip or ribbon of paper by means of coiled springs 62 which are disposed in apertures 63 formed in the side plates 58 (Fig. 11), and retaining caps 64 which are secured to the upper edges of the plates 58 by means of screws 65. These springs bear against the bearing blocks 60 and the pressure exerted thereby may be regulated by means of screws 66 which are threaded into the retaining caps 64 for engagement with spring followers 67 which are slidably mounted in the apertures 63 above to the upper ends of the springs 62.

The upper roll 53 is driven by a gear wheel 68 (Figs. 10, 15 and 16), which is fixed to the shaft 59 for intermeshing engagement with a gear wheel 69 of corresponding size which is fixed to the shaft 57 of the lower roll 54. The gear 69 is formed with a hub portion 70, (Figs. 13 and 14), which is grooved as at 71 to receive a sliding clutch pin or key 72, (Figs. 13 and 14), which also engages a keyway 73 provided in the shaft 57 and which is normally urged outwardly by a coiled spring 74 (Fig. 13). The outer extremity of this pin is adapted to engage one of a plurality of radial slots 75 provided in a collar 76 which is fixed to a constantly rotating shaft 77. This shaft is journalled in a bearing 78 (Figs. 10, 13 and 14), carried by a housing 79 which is mounted on the adjacent side plate 58 and which encloses the gears 68 and 69 and the clutch elements. A sprocket wheel 80 is fixed to the outer end of the shaft 77 and is driven by a sprocket chain 81 which is in turn driven by a sprocket wheel 82 (Figs. 9 and 26) fixed to the outer end of the jack shaft 28.

The rotation of the roll 54 may be discontinued by means of a lever 83 (Figs. 11, 15 and 16), which is fixed to a shaft 84 journalled in one of the side plates 58 and which is provided with a bevelled extremity 85 (Figs. 13, 14, 15 and 16). This lever is adapted to be swung by mechanism hereinafter described to a position in which the bevelled upper extremity 85 thereof is in the path of the clutch key 72 and be engaged thereby as it rotates. As soon as the key 72 engages the bevelled portion 85 of the lever 83, it is cammed inwardly thereby against action of the spring 74 and out of engagement with the slot 75 of the constantly rotating collar 76, thereby disconnecting these elements in a well known manner.

A strip of paper upon leaving the supply roll 55 first passes upwardly over a roll 86 (Figs. 11, 15 and 16), which is mounted on a shaft 87 journalled in the side plates 58 and thence around and over a stationary bar 88 (Figs. 11, 15 and 16), from which it passes between the pinch rolls 53 and 54. The bar 88 is supported at each end by rack bars 89 which are slidably mounted in guides 90 formed in the side plates 58 and functions to remove the curvature from the paper caused by being wound in a roll, by bending the paper in an opposite direction. The bar 88 may be adjusted toward or away from the rolls 53 and 54, in order to increase or decrease the angle at which the paper is bent, according to the resistance offered by its curvature, the degree thereof and the thickness of the paper; by means of gears 91 (Fig. 11), which are fixed to each end of a shaft 92 for intermeshing engagement with the racks 89. The shaft 92 is journalled in the side plates 58 and may be rotated by means of a crank handle 93 and maintained in adjusted position by means of a spring latch pin 94 (Figs. 10 and 11), which is carried by the crank handle 93 for engagement with a series of apertures 95 provided in a plate 96 secured to the adjacent side plate 58.

After passing between the rolls 53 and 54 the paper passes upwardly and over the roll 53, thence downwardly and beneath a slack take-up roll 97

(Figs. 10, 11, 15 and 16), the purpose of which will be presently described, and thence upwardly and over a roll 98 which is mounted on a shaft 99 journalled in the side plates 58. From the roll 98 the paper is drawn intermittently through the machine by a secondary feeding mechanism hereinafter to be described in detail.

The hereinbefore described continuous feeding mechanism prevents the paper from being subjected to suddenly applied excess tension such as would result in periodically overcoming the inertia of the relatively heavy supply roll in the event that the paper were drawn therefrom directly by the intermittent feed mechanism.

Inasmuch as it is difficult if not impossible to so synchronize the continuous feed of the paper from the supply roll and the intermittent feed of the paper through the machine so that they will both feed the same quantity of paper within a given interval of time, it is obviously necessary to feed the paper from the supply roll at a slightly faster rate than it passes through the machine. Were it otherwise the paper would be subjected to the identical suddenly applied strains of the intermittent feed mechanism that it is the function of the continuous feed mechanism to avoid. In so doing, however, an excess quantity of paper collects between the feed rolls 53 and 54 and the punching unit and therefore to take up this extra supply of paper or slack and to maintain the paper under a predetermined constant tension the roll 97 is arranged to be supported entirely by the paper and to move upwardly and downwardly therewith accordingly as the supply of paper diminishes or increases.

This roll is fixed to a shaft 100 the ends of which project into vertical slots 101 provided on the inner faces of the side plates 58 (Figs. 10, 11 and 12). Gear wheels 102 are also fixed to the shaft 100 adjacent to each end thereof for engagement with rack bars 103 which are secured to the side plates 58 adjacent the slots 101 (Fig. 12). This construction insures that the roll 97 remains horizontally disposed in all vertical positions.

It will be apparent that inasmuch as the roll 97 has only a limited degree of vertical travel the supply of paper delivered by the feed rolls 53 and 54 must be occasionally discontinued for a period of time of sufficient duration to permit the accumulated supply of paper to be drawn into the machine by the intermittent feeding mechanism. This is accomplished by means of a lever 104 which is pivotally mounted intermediate of its length upon one of the side plates 58 (Figs. 15 and 16). The lower arm 105 of this lever projects into the path of movement of the shaft 100 of the slack take-up roll 97 adjacent its lower limit of travel and the upper arm 106 thereof is provided with a notch 107 for engagement with a pin 108 carried by a lever 109 which is fixed to the clutch operating shaft 84 (Figs. 11, 15 and 16). The lever 109 is provided with an arm 110 which also extends into the path of movement of the shaft 100 adjacent to its upper limit of travel.

As the excess paper collects between the feed rolls and the punching units, the roll 97 will descend under the action of gravity (Fig. 15) until the shaft 100 thereof engages the arm 105 of the lever 104 and forces it inwardly. This movement of the lever 104 swings the upper arm 106 thereof outwardly and carries the notch 107 out of engagement with the pin 108. As soon as this occurs the lever 83 will swing to the right, as viewed in Fig. 15, under the action of a spring 111 and carry the cam face 85 thereof into the path of movement of the clutch pin 72 and declutch the feed rolls 53 and 54. During this temporary cessation of the operation of the feed rolls the intermittent feeding mechanism draws the excess supply of paper into the punching unit elevating as it does so, the slack take-up roll 97. As soon, however, as the roll 97 reaches its upper limit of travel, its shaft 100 engages the arm 110 of the lever 109 and swings it to the left, as viewed in Fig. 16. This movement of the lever 109 rotates the shaft 84 and swings the lever 83 out of engagement with the clutch pin 72 and permits it to reestablish driving engagement with the constantly rotating collar 76 and resume the feed of paper. When the lever 109 swings upwardly the pin 108 carried thereby is again brought into registry with the notch 107 in the lever arm 106 which swings into its initial position under the action of a spring 112 and maintains the declutching lever 83 in an inoperative position until it is again necessary to discontinue the operation of the feed rolls.

The feeding rolls 53 and 54 may be separated against the action of the springs 62 in order to initially thread the strip of paper into the machine or to replenish the supply when the roll becomes exhausted by means of a hand lever 113 which is fixed to a shaft 114 journalled in the side plates 58 (Fig. 11). The lower arm 115 of this lever is provided with an operating handle 116 and the upper arm 117 thereof is adapted to engage a notch 118 provided in a latch lever 119. This lever is pivotally mounted on the side plate 58 at 120 and is formed with an extension or tongue 121. A pair of arms 122 are fixed to the shaft 114 and are adapted to engage beneath the slide bearings 60. When it is necessary to separate the rolls 53 and 54 for the purposes mentioned, the lever 113 is moved manually in a clockwise direction to the position shown in Fig. 11. This movement of the lever 113 causes the arms 122 to raise the bearings 60 and elevate the upper feed roll 53 carried thereby out of engagement with the lower roll 54. This clockwise motion of the lever 113 also causes the upper arm 117 to engage beneath the latch lever 119 and to lift the same until the notch 118 drops into retaining position over the extremity of the lever arm 117. When it is desired to again lower the feed roll 53 into cooperative relation with the roll 54, it is only necessary to lift the latch lever 119 thus permitting the roll 53 to return to its initial position under the action of the springs 62.

In order to insure against a possibility of the operator forgetting to release the rolls 53 and 54 when the machine is started and to thus permit the paper to be drawn from the supply roll intermittently by the secondary feeding mechanism, an abutment screw 123 (Figs. 9 and 11) is provided on the upper or movable die element of the perforating mechanism for engagement with the tongue 121. If the latch lever 119 is not manually tripped before the operation of the machine is commenced, the screw 123 will engage the tongue 121 on the first downward movement of the die element and elevate the latch lever 119 out of engagement with the hand lever 113 thus permitting the rolls 53 and 54 to engage the paper under the action of the springs 62.

*Punching unit*

The punching unit B may be of any suitable construction or commercial type but for the purpose of explanation is shown as comprising a lower die member 124 which is fixed to a pedestal 125 carried by the bed 14 (Fig. 9). An upper die member 126 is mounted for vertical sliding movement in guides 127 and pins 128 carried by the pedestal 125. This member is reciprocated by means of links 129 which are pivotally connected at their upper extremities to eccentrics 130 formed on the ends of a shaft 131 which is fixed in bearings 132 formed on the member 126 (Fig. 10). The shaft 131 is provided with a squared portion 133 intermediate of its ends by means of which it may be turned to adjust the degree of eccentricity of the ends 130 and the throw of the moving die member governed thereby. The lower ends of the links 129 are pivotally connected to crank arms 134 (Figs. 9 and 10), which are fixed to the ends of a rock shaft 135 journalled in the pedestal 125. The crank arms 134 are rocked to and from a substantially vertical position in order to close and separate the die members 124 and 126; by a connecting rod 136 (Figs. 9 and 25), pivotally connected at one end to one of the crank arms 134 and at its other end to an arm 137 of a bell crank lever 138 fixed to a shaft 139 journalled in bearings 140 and 141 formed on the brackets 31 and 32 respectively (Figs. 25 and 26). The other arm 142 of the lever 138 is provided with a roller 143 for engagement with a cam groove 144 formed in the outer face of the gear 27.

In operation the movable die 126 punches the paper during a dwell in the movement thereof by the operation of cam 27 moving link 136 to operate links 129 and levers 134 to nearly vertical position. The links 129 and levers 134 are rotated to the right in an anti-clockwise direction, as shown in Fig. 9, to raise the die member 126 preparatory to the punching operation after the paper sheet has been moved one step in its intermittent feed through the machine.

*Secondary paper feeding mechanism*

The paper is intermittently drawn through the punching unit B and delivered to the sheath attaching unit C by means of a reciprocating carriage designated as a whole at 145 in Figs. 9, 20, 25, 26 and 28. This carriage is mounted for reciprocation adjacent to the forward edge of a table 146 (Fig. 26) which is part of the bracket 32. This carriage comprises a rack bar 147 provided with a longitudinally extending slide member 148 on its inner face adapted to engage a dovetail groove 149 formed in the edge of the table 146 (Fig. 29). A guide plate 150 is secured to each end of the bar 147 and slidably supports a longitudinally reciprocable latch bar 151. Transversely extending pins 152 and 153 fixed in each end of the bar 151 are adapted to project through upwardly inclined slots 154 provided in a pair of index pins or plates 155 mounted for vertical sliding movement in the guide plates 150. The pin 153 also projects forwardly through a slot 156 provided in the right hand guide plate 150 for a purpose presently to be described.

The plates 155 are provided with horizontally extending flanges 157 and with upwardly extending lugs 158 adapted to project through the slots 11 in the paper (Fig. 1) and engage elongated apertures 159 provided in overhanging flanges 160 formed on the guide plates 150. The index plates 155 are yieldably urged upwardly so as to grip the edge of the paper between the upper face of the flanges 157 and the lower face of the flanges 160 of the guide plates 150; by means of coiled springs 161 disposed in apertures 162 provided in the rack bar 147 and which bear against the lower faces of the flanges 157 (Fig. 29).

The carriage 145 is reciprocated longitudinally along the table 146 and between adjustable stops 163 arranged at each end of its path of travel, by means of a gear wheel 164 (Figs. 25, 26 and 28) rotatably mounted on a shaft 165 fixed in the bracket 32. A pinion 166 is fixed to the gear wheel 164 and is alternately rotated in opposite directions by means of a segmental rack 167 mounted for oscillation on the shaft 139 (Figs. 25, 26 and 28). The rack 167 is provided with a downwardly extending arm 168 (Figs. 25 and 26) formed with a pair of spaced cylindrical portions 169 in which a pair of oppositely opposed spring actuated plungers 170 are adjustably mounted for engagement with the opposite sides of an arm 171 of a bell crank lever 172 mounted on the shaft 139. The other arm 173 of the lever 172 is provided with a roll 174 for engagement with a cam groove 175 (Fig. 25) provided in the inner face of the gear 27. This construction permits of a certain degree of yieldability between the cam operated lever arm 173 and the segmental rack 167 at the limit of travel in each direction and corrects slight inaccuracies due to back lash between the rack 167 and pinion 166 and between the gear 164 and the rack bar 147 as well as for inaccuracies resulting from wear and insures that the travel of the carriage 145 will terminate exactly at the points where it is arrested by the stops 163.

The plates 155 are retracted to release the paper just prior to the return movement of the carriage and at the conclusion of the sheath attaching operation by means of a lever 176 mounted for oscillation on the stud shaft 165 (Fig. 28). This lever is provided with an upper trip arm 177 and a lower arm 178 which carries a roller 179 for engagement with a double throw cam groove 180 formed in the inner face of a disk cam 181 fixed to the jack shaft 28 (Figs. 25, 26 and 28). When the lever 176 is swung in a counter-clockwise direction by the rotation of the cam 181 the upper arm 177 engages the pin 153 and forces the slide 151 to the left, as viewed in Fig. 28. This horizontal movement of the slide 151 causes the pins 152 and 153 carried thereby to force the plates 155 downwardly and out of engagement with the paper through their engagement with the inclined slots 154 provided therein and against the action of the springs 161.

When the slide bar 151 is thus actuated a latch 182 carried thereby is moved to a position where it is engaged by a spring actuated detent 183 pivotally mounted on left-hand guide plate 150 and maintains the bar 151 in this position and the plates 155 retracted during the return movement of the carriage.

As soon, however, as the carriage reaches the limit of its return travel, the cam 181 again swings the lever 176 in a counter-clockwise direction but, on this occasion, the trip arm 177 thereof engages an arm 184 provided on the detent 183 and releases the bar 151, thus permitting the plates 155 to rise under the action of the springs 161 and grip the paper between the flanges 157 and 160 for the next feeding movement.

The plates 155 may be retracted manually for the purpose of threading the paper into the machine by means of a lever 185 (Fig. 30) which is pivotally mounted on the right-hand guide plate 150, (Fig. 28), as at 186. This lever is provided with a finger 187 adapted to project into a slot 188 formed in the slide bar 151. When the lever 185 is swung outwardly, the finger 187 forces the bar 151 to the left and depresses the plates 155 against the action of the springs 161.

Sheath or tip feeding mechanism

The celluloid sheath or tip 3 of the pocket is fed continuously from the mechanism 13 (Fig. 3) that folds it into the shape shown, by means of a pair of pinch rolls 189 and 190 (Figs. 15 and 17). The roll 190 is fixed to a shaft 191 which is journalled in a bearing 192 formed on an extension 193 of the bearing 78. A spiral gear 194 is fixed to the shaft 191 for engagement with a spiral gear 195 which is fixed to the end of the constantly rotating shaft 77. The roll 189 is mounted on an arm 196 which is pivotally mounted on the extension 193 and is urged toward the roll 190 so as to maintain the sheath in driving contact therewith.

After leaving the rolls 189 and 190 the sheath passes outwardly from the machine a substantial distance and then bends inwardly and enters the sheath attaching unit which will be presently described. The sheath thus forms a loop (Fig. 17) which is supported at its outermost position by a bar 197 which is secured to the housing 79 and extends outwardly therefrom. This loop in the sheath provides for the continued feed thereof from the forming device 13, during periods of dwell in its intermittent feed to the sheath attaching unit.

Safety throw-out mechanism

Figure 18:
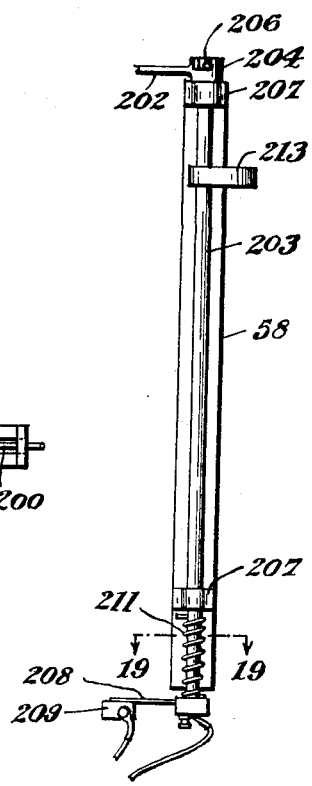
Fig. 18 is an end view of a portion of the automatic shut-off mechanism illustrated in Fig. 17.
Figure 19:
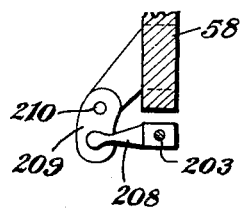
Fig. 19 is a horizontal sectional view taken on line 19—19 of Fig. 18.

A spring arm 198 (Figs. 9 and 17) is secured at its inner end to the housing 79 and extends outwardly over the bar 197. The outer portion of this arm extends downwardly into a slot 199 formed in the bar 197 and thence upwardly at an angle over the sheath to form a cam surface 200 (Fig. 9). The arm 198 is also provided with a shoulder 201 adjacent to its inner end for engagement by a handle 202 (Figs. 17 and 18), which is mounted on the upper end of a vertical shaft 203. The hub 204 of this lever is provided with a slot 205 (Fig. 17) adapted to receive a pin 206 carried by the shaft 203. This slot and pin connection permits the shaft to rotate in a clockwise direction without imparting movement to the handle but insures that movement of the handle in such direction will cause the rotation of the shaft. The shaft is journalled in bearings 207 provided in the side plate 58 and carries at its lower extremity a contact finger 208. This finger is connected to a source of electric current and is adapted to ride on an arcuate member 209 formed of an insulating material and carries an electric terminal 210 (Figs. 18 and 19). During the normal operation of the machine this finger is maintained in the position shown in Fig. 19 with the electric circuit broken, by means of a spring 211 which encircles the lower end of the shaft 203. If, however, the feed of the celluloid sheath should be slower than that of the paper to which it is to be attached or if the feed thereof should for any reason be discontinued, the loop in the sheath will become contracted and force the spring arm 198 upwardly through engagement with the inclined portion 200 thereof. This upward movement of the arm 198 carries the shoulder 201 out of retaining engagement with the handle 202 which will immediately be released thereby and rotated in a clockwise direction by a spring 212. The rotation of the handle 202 causes a corresponding movement of the shaft 203 through the engagement of the pin 206 by the shoulder formed by the end of the slot 205. This rotation of the shaft moves the finger 208 into engagement with the contact 210 and establishes an electric circuit through the electromagnet 49 (Fig. 27). The energization of this magnet causes the armature 50 thereof to descend and to rock the shaft 42 and open the knife switch 40 in a manner previously described, thus stopping the entire machine.

In the event that the feed of paper should for any reason be interrupted during the downward travel of the roll 97 and before the clutch is disengaged by the engagement of the shaft 100 with the lever 104, the roller will commence to again move upwardly while the arm 110 of the lever 104 occupies a position without the path of movement of the shaft 100 (Fig. 15). To provide for such a contingency an arm 213 is also fixed to the shaft 203 and is adapted to be engaged by the roller 97 as it approaches its upper limit of travel. This engagement of the arm 213 by the roller 97 rotates the shaft 203 and establishes a circuit through the switch arm 208, thus not only stopping the feed rolls without operating the feed roll clutch but discontinuing the operation of the entire machine.

Sheath-positioning means

The celluloid sheath after leaving the feeding unit passes around the punching unit and through a separating and guiding member 214 (Figs. 20, 21 and 22) mounted upon a bridge 215 supported at its ends by the brackets 32 and 125. This member is located adjacent to the edge of the paper strip as it passes along the bridge 215 upon emerging from the punching unit and is provided with a pair of flanges 216 through which the paper is adapted to slide and which levels the paper prior to the attachment of the sheath. The sheath passes through the member 214 and is guided thereby into position to engage over the horn 217. After leaving the member 214 the paper and the sheath next pass into engagement with a horn 217 (Fig. 23) which is also mounted on the bridge 215 and which separates the folds of the sheath. This horn is shaped to guide the sheath and the paper into accurate engagement with each other. During this operation the paper is maintained against lateral displacement by means of a guide 218 which is fixed to the edge of the bridge 215 and both the paper and the sheath are maintained against vertical displacement by means of the horn 217 and a resilient retaining member 219 carried thereby. When the paper leaves the horn 217 with the sheath enclosing the edge thereof, it next passes a roller 220 (Fig. 24), which engages the sheath and rolls it into a snug and accurate fit with the edge of the paper.

The stapling unit

The paper with the celluloid sheath frictionally engaging the edge thereof is next fed to the stapling unit C which permanently secures them together by means of the staples 4 (Fig. 1). This stapling unit and its various parts are illustrated in Figs. 9, 20, 25, 26 and 27. This unit comprises a pedestal 221 which is formed with vertical bearings 222 rotatably receiving a shaft 223 fixed in a bearing 224 formed in the bed 14 of the machine. By means of this construction the entire unit may be swung to an inoperative position (Fig.

20) to provide access thereto for adjustment or repairs. The unit may be locked in its operative position by means of a pin 225 which is slidably mounted in a lug 226 formed on the lower bearing 222 for engagement with an aperture 227 provided in the bed 14. A transversely extending drive shaft 228 is journalled in a horizontal bearing 229 formed on the upper portion of the pedestal 221 and is intermittently rotated by means of a pulley 230 which is mounted for free rotation on the outer end thereof but which is periodically connected thereto by means of suitable clutch mechanism of a well known commercial type, not shown. This pulley is constantly rotated by a belt 231 which is driven by a pulley 232 fixed to the main drive shaft 20.

A frame 233 is secured to the pedestal 221 in overhanging relation to the paper as it passes along the table 146 and carries a pair of stapling devices of a well known commercial type such as that disclosed in Patents No. 662,184, Nov. 20, 1900, No. 970,461, Sept. 20, 1910, and No. 971,247, Sept. 27, 1910 and each briefly comprises a stationary member 234 and a vertically reciprocable member 235 which forms the staples from wire supplied thereto from a roll 236 carried by the frame 233 and forces them through the sheath and paper. The members 235 are actuated by means of a plate 237 to which they are attached and which is mounted for vertical sliding movement in guideways 238 formed in the frame 233. This plate is reciprocated by a crank 239 which is provided on the forward end of the shaft 228.

A clincher member 240 (Figs. 26 and 27), cooperates with each of the movable members 235 of the stapling mechanism and these members are mounted for vertical reciprocation in extensions 241 of the frame 233. These members 235 are pivotally mounted at their lower extremities to the arms 242 of a Y-shaped lever 243. This lever is pivotally mounted upon the side of the frame 221 as at 244 and is provided with an arm 245 which is adapted to be engaged by a vertically extending rod 246. This rod is slidably mounted in the frame 221 and carries a roller 247 at its upper end for engagement with a cam 248 fixed to the drive shaft 228. Springs 249 are secured to the outer end of the arm 245 and to the frame 221 and tend to maintain this arm in an elevated position with the clincher members 240 retracted (Figs. 26 and 27).

An intermediate stapling device of similar construction is also carried by the frame 221 beneath the level of the paper as it passes along the table 146. This device comprises a stationary member 250 (Figs. 20 and 27, omitted from Fig. 26 for convenience in illustration of other parts), which is secured to a projection 251 (Figs. 20 and 26), of the frame 221 and with a vertically reciprocating stapling member 252 which is adapted to form staples from wire supplied thereto by an intermediate supply roll 253 carried by the frame 221 and to force it upwardly through the paper and the sheath. This member is actuated by the plate 237 through the medium of the bar 254 and lever 255, the bar being secured at its upper extremity to the plate 237 (as shown in Fig. 25) and at its lower extremity to an arm of the lever 255, (Figs. 20 and 27). This lever is centrally pivoted upon a stud 256 (Fig. 26), carried by the frame 221 and is secured at its outer end (Fig. 27) to the member 252. Thus when the plate 237 moves downwardly, bar 254 is carried with it and acts as a link to move lever 255 about its pivot and operate member 252 in an upward direction. A cooperating clincher member 257 (Fig. 25), is slidably mounted in its guide member 257' which is secured to the frame 233 above the level of the paper and is secured to the outer end of a lever 258 (Figs. 20, 25 and 26), which is pivotally connected to the frame 221 at 259 (Fig. 26). The clincher member 257 substantially identical in structure but inverted in position relative to clincher members 240, is reciprocated vertically in timed relation to the movement of the clincher members 240, by means of a link 260 (Fig. 26), which pivotally connects the lever 258 with the arm 245 of the lever 243.

The clutch mechanism of the stapling device is periodically clutched and de-clutched in order to intermittently actuate the stapling devices in timed relation to the movement of the paper, by means of a lever 261 which is fixed to one end of a rock shaft 262 (Fig. 25). This shaft is journalled in a bearing 263 formed on the bracket 32 (Fig. 26) and has an arm 264 fixed thereto at its other end. The arm 264 (Figs. 26 and 27), extends rearwardly at an angle to the axis of the shaft 262 beyond the end of shaft 262 to clear pedestal 221 so that it may be pivotally connected at its outer end to a vertically extending link 265 (Figs. 26 and 27). This link is connected at its upper end to an arm 266 which is fixed to one end of a rock shaft 267 (Figs. 26 and 27), journalled in the upper portion of the frame 221 adjacent to the pulley 230. An arm 268 is fixed to the other end of the shaft 267 for engagement with a clutch operating pin 269 which is slidably mounted in the bearing 229, and operates the clutch mechanism (not shown) for connecting the shaft 228 to the driven pulley 230.

The lever 261 is operated by the cam face on the outer periphery of the cam 181 having the stitcher operating projection 261ª for engagement with roller 261' on lever 261. When projection 261ª operates lever 261, it rocks shaft 262, arm 264, lever 265, shaft 267, and through arm 268, moves pin 269 to secure operation of the clutch, so that pulley 230 will rotate shaft 228 and operate stitcher unit C through the movement of plate 237. The rotation of shaft 228 also operates lever 243 (Fig. 26), by cam 248 and rod 246 to operate clinchers 240 and 257. The rotation of shaft 262 also operates the separating unit simultaneously.

Separating unit

At the conclusion of the sheath attaching operation the paper and sheath are moved to the separating unit D by the next feeding stroke of the carriage 145 where both the paper and attached sheath are simultaneously severed into the desired lengths. This unit comprises a frame 270 (Figs. 25, 26 and 27) secured to the end of the table 146 and provided with guideways or slots 271 in which a cutter head 272 is mounted for vertical sliding movement. An upper cutter blade 273 is fixed to the head 272 for cooperation with a lower cutter blade 274 mounted for vertical adjustment on the frame 270. A bar 275 is also carried by the head 272 and is adapted to yieldably engage the paper in advance of the cutter blade 273 and maintain it against displacement during the severing operation. The cutter head 272 and blade 274 carried thereby are reciprocated in timed relation to the movement of the paper along the table 146 so as to perform the severing operation during a period of dwell in the movement thereof, by means of links 276. These links are pivotally connected at their upper ends to the cuter head 272 at each side thereof and at their lower extremities to arms 277 fixed to the rock shaft 262 on each side of its bearing 263. It will be noted at this point that severing the paper and the attached sheath at the same time and by one operation is of considerable importance in that it insures that both paper and sheath are of exactly the same length and accurately positioned with respect to each other which was heretofore difficult of attainment in the manual method of assembly.

The arms 277 are operated through rotation of shaft 262 by means of projection 261$^a$ on cam 181 operating arm 261. Following the projection 261$^a$ in the direction of rotation of cam 181, it will be noted that the portion 181$^a$ is of greater radius than the portion 181$^b$ as shown in Fig. 25. This portion 181$^a$ holds the arms 277 in position so that after the knife has severed the strip, the bar 275 will continue to hold the paper strip in position during the entire dwell between its successive movement and the completion of the stitching operation by unit C. At the end of this stitching operation, the incline 261$^b$ (Fig. 25), then permits arm 261 to return to its normal position with the parts operated thereby for the next feeding movement of the paper strip.

*Transfer mechanism*

The sections of paper severed from the strip by the separating unit D are successively conveyed to the lug attaching unit E and thence to the stacking or grouping unit F, both of which units will be hereinafter described, by a transfer mechanism which comprises a pair of carriages 278 and 279 which are mounted for reciprocatory motion between said units along rails 280 and 281 respectively (Figs. 31 to 37). These rails are secured together in spaced parallel relation and are supported at their ends by the frame 270 of the separating unit D and the frame of the grouping unit F.

The carriage 278 (Figs. 27, 31, 32 and 37), is of hollow construction and is mounted directly on slides 282 which slidably engage the rail 280. The interior of the carriage 278 communicates with the outer atmosphere through apertures 283 (Fig. 32), and with a source of reduced pressure through a flexible hose on pipe 284 (Fig. 27).

Figure 53:
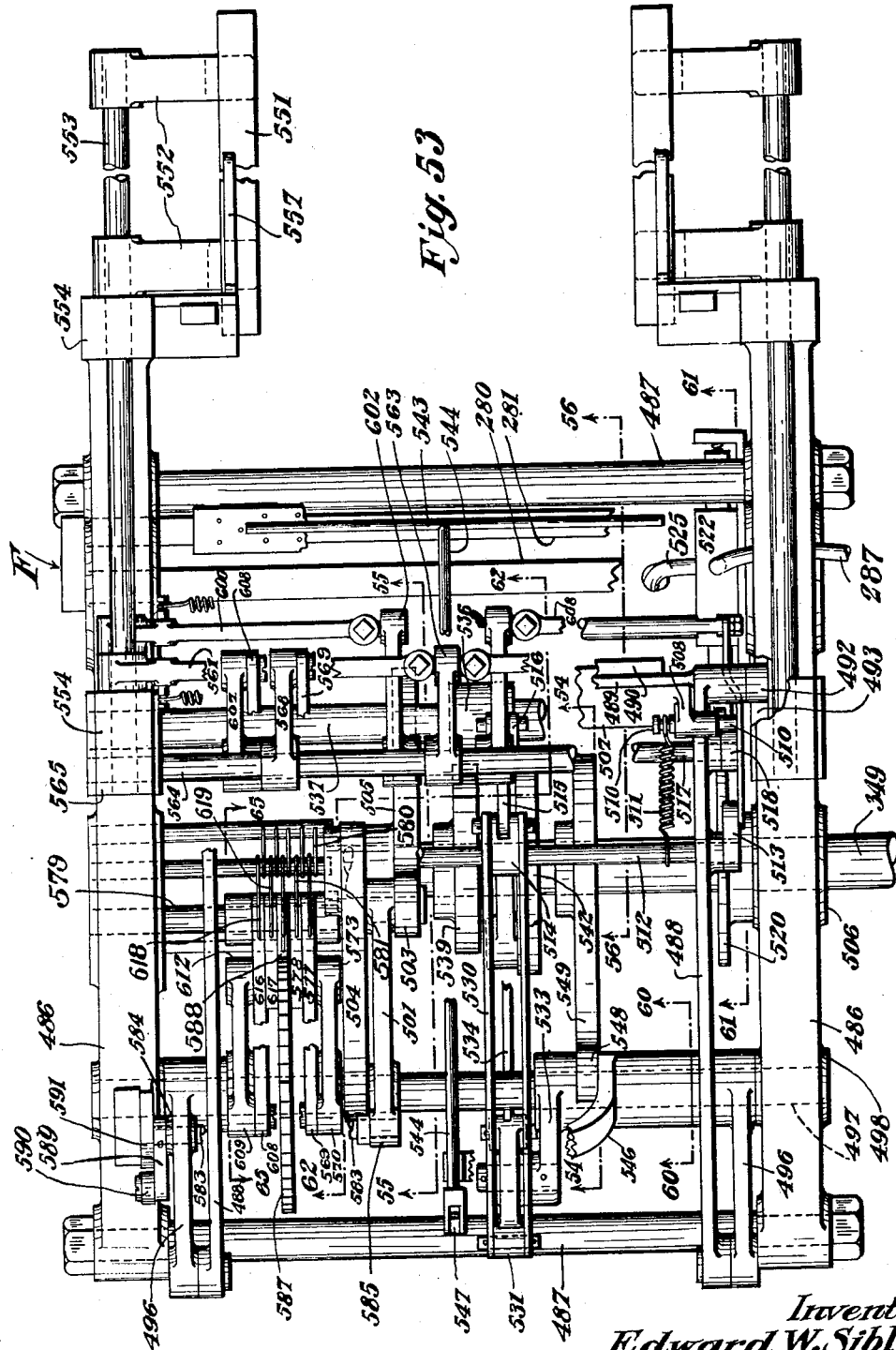
Fig. 53 is a plan view of the structure shown in Fig. 52.

The carriage 279 (Figs. 31, 37 and 56), is also of hollow construction and is mounted on slides 285 for slidable engagement with the rail 281. The interior of this carriage also communicates with the outer atmosphere through apertures 286 (Fig. 56), and with the source of reduced pressure through a flexible hose or pipe 287 (Figs. 31 and 53). The carriages 278 and 279 are simultaneously reciprocated toward and away from each other and to and from a position in side-by-side relation adjacent to the lug attaching unit E and positions adjacent to the separating unit D and the grouping unit F (Fig. 37) by the following mechanism.

A rack bar 288 (Figs. 31 and 32), is fixed to the slides 282 for intermeshing engagement with a gear wheel 289 which is rotatably mounted on a stud shaft 290 fixed in a bracket 291 secured between the rails 280 and 281. A gear wheel 292 (Figs. 31, 32 and 33), is fixed to the gear 289 and is rotated by a rack 293 which rides on a roller 294 carried by an arm 295 depending from the bracket 291. The rack 293 is reciprocated by means of bars 296 which are secured to each side thereof and which are connected to the paper feeding carriage 145 at 297 (Fig. 28). By means of this arrangement the carriage 278 is moved to the lug attaching unit simultaneously with the return stroke of the carriage 145 and returned to its initial position adjacent to the separating unit D simultaneously with the paper feeding stroke of the carriage 145.

A rack bar 298 is secured to the slides 285 of the carriage 279 for intermeshing engagement with a gear wheel 299. This gear is journalled in a bracket 300 mounted on a rack bar 301 for rolling engagement with a stationary rack bar 302 fixed to brackets 303 carried by the rails 280 and 281 (Figs. 31, 34, 35 and 36). The rack bar 301 and gear 299 carried thereby are moved longitudinally with respect to the stationary rack bar 302 by means of a gear wheel 304 fixed to a shaft 305. This shaft 305 is journalled in a bearing 306 formed in a bracket 307 which is also secured between the rails 280 and 281 (Fig. 35) and has a gear wheel 308 fixed thereto at its other end for engagement by a reciprocating rack bar 309 which is also secured between the bars 296 (Fig. 33). The rack bar 309 is maintained against vertical displacement by means of a roller 310 which is carried by the bracket 307 for rolling contact with the upper side thereof. The differential action between the stationary rack bar 302, gear 299 and the movable rack bar 298 causes the carriage 279 to travel twice the distance traveled by the carriage 278 which is rendered necessary by the difference in the distance between the several units.

*Alternative transfer mechanism*

Figure 40:
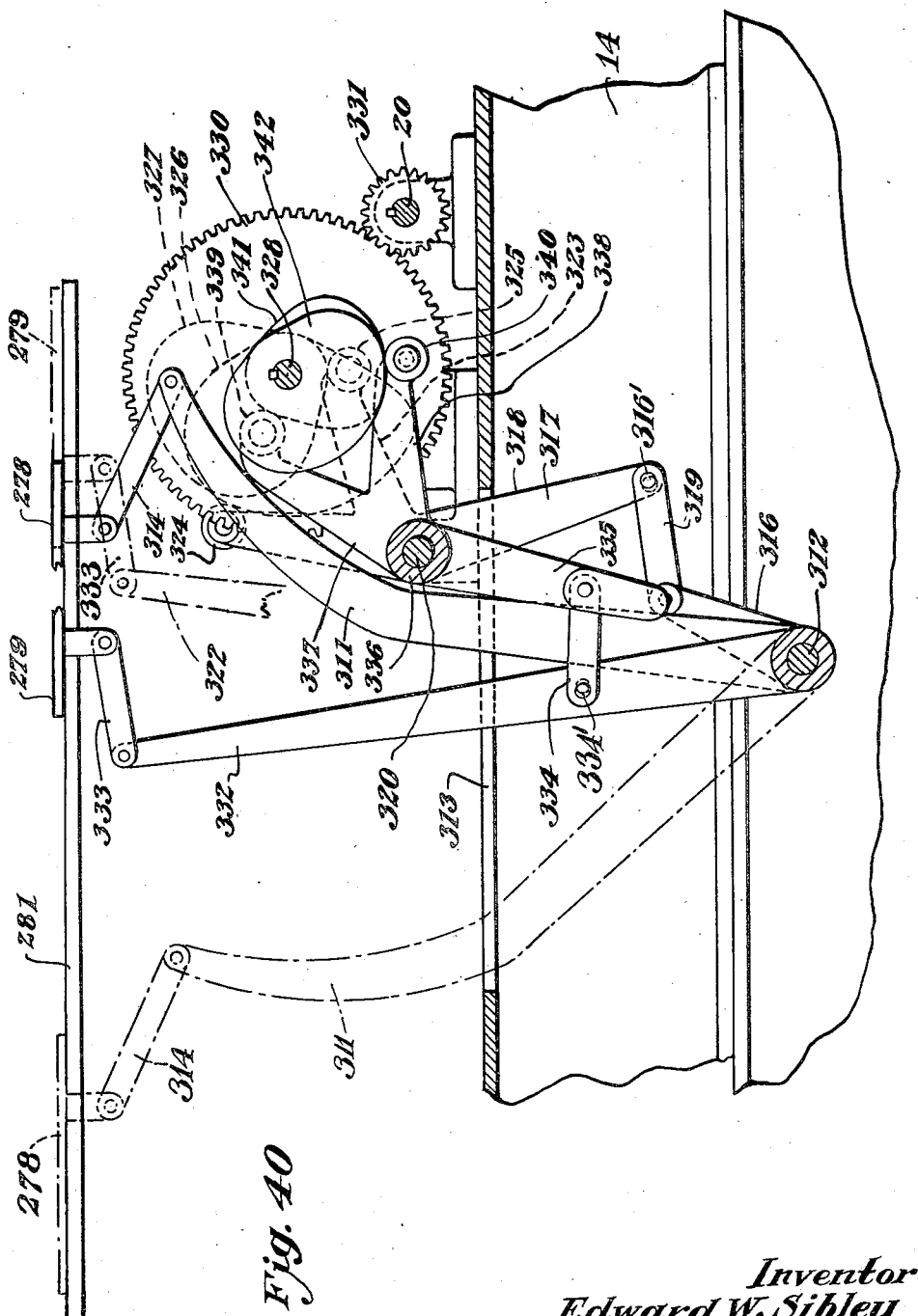
Fig. 40 is a vertical transverse sectional view taken on line 40—40 of Fig. 38.

By reason of the fact that it is imperative that the several cards or sections of paper be transferred to and positioned in the lug attaching unit with utmost accuracy, it may be found that the degree of back lash or lost motion between the various gears and rack bars will be multiplied to such an extent as to impair the function of the transfer mechanism in this respect. In such event it may be found desirable to substitute for the mechanism heretofore described, a lever arrangement such as that shown in Figs. 38, 39 and 40.

In this construction the carriage 278 is reciprocated on its track 280 by means of a lever 311 which is fixed to a rock shaft 312 and which extends upwardly through an opening 313 in the bed 14 and is connected at its upper end to the slide 282 by a link 314. The shaft 312 is journalled in bearings 315 carried by the bed 14 and carries a lever 316 which is connected to an arm 317 of a Y-shaped lever 318 by a link 319. The pivotal connection between the link 319 and the arm 317 comprises an eccentric bushing 316' by means of which the degree of throw of the lever 311 and the limits of travel of the carriage 278 may be accurately determined. The lever 318 is mounted for oscillation on a shaft 320 journalled in a bearing 321 carried by the bed 14 and the diverging arms 322 and 323 thereof are provided with rollers 324 and 325 for engagement with conjugate cams 326 and 327 respectively. These cams are fixed to a shaft 328 which is journalled in bearings 329 carried by the bed 14 and has a gear wheel 330 fixed thereto for intermeshing engagement with a pinion 331 which is fixed to the main drive shaft 20 of the machine.

The carriage 279 is reciprocated on its track 281 by means of a lever 332 mounted for free relative angular movement on the rock shaft 312, extends upwardly through the opening 313 in the bed 14, and is connected at its upper end to the slide 285 by a link 333. A link 334 is pivotally connected at one end to an eccentric stud 334' on the lever 332 intermediate of its length, and the other end thereof is connected to an arm 335 of a second Y-shaped lever 336 mounted for oscillation on the shaft 320. The deverging arms 337 and 338 of the lever 336 are provided with rollers 339 and 340 for engagement with another pair of conjugate cams 341 and 342 respectively fixed to the shaft 328. The limits of travel of the carriage 279 may also be accurately determined by adjusting the throw of the lever 332 by means of the eccentric stud 334'.

By means of this construction, the carriages 278 and 279 are simultaneously reciprocated in opposite directions on their tracks or rails 280 and 281 and the length of their paths of travel is determined by the length of the several lever arms, the location of their fulcrum points and the points of application of power.

A bar 343 (Fig. 27), is carried by the cutter head 272 and is adapted to yieldably engage the paper on the downward stroke of the cutter and force it into close contact with the carrier 278 and in the range of the suction applied through the apertures 283 therein. This suction maintains the severed card against displacement during the transfer movement. The carrier 279 arrives at the stapling unit on its return or idle stroke simultaneously with the arrival at this unit of the carrier 278 and imediately engages the card carried thereby and holds it in intimate contact therewith by the suction applied through the apertures 286. It will be noted that the card is thus held firmly against both carriers during the stapling operation. At the conclusion of the stapling operation the suction applied through the apertures 283 of the carriage 278 is cut off thereby releasing the card preparatory to the return stroke but the suction applied through the apertures 283 of the carrier 279 is continued so as to prevent the displacement of the card during the travel of this carrier to the grouping unit.

The application of reduced pressure to the carrier 278 is controlled by a valve 344 which is mounted on a bracket 345 depending from the frame 270 of the separating unit (Fig. 27). This valve is provided with a valve stem 346 which is urged upwardly to a closed position by a spring 347 but which is adapted to be engaged by the hub of the lever 277 and be depressed thereby upon the downward stroke of the cutter to establish communication between the interior of the carrier 278 and a source of reduced pressure.

The valve which controls the application of suction to the carrier 279 is associated with the grouping unit F and will hereinafter be described.

Lug forming and attaching unit

The lug attaching unit E embodies mechanism for feeding a strip of relatively heavy paper or other suitable material from a supply roll, means for severing the paper into strips of the desired width for the lugs, means for positioning the lugs thus formed with respect to the pocket, stapling devices for securing the lugs to the pocket, and means for creasing the lug to form the offset 10. All of these instrumentalities are mounted on a frame 348 (Figs. 41, 42 and 43), carried by the bed 14 of the machine and, with the exception of the stapling devices and lug creasing means, are all driven by a constantly rotating cam shaft 349. This shaft is mounted in bearings 350 (Fig. 41), and 351 (Figs. 25 and 26) formed in the frame 348 and in the bracket 31 and is provided with a spiral gear 352 at one end for intermeshing engagement with a spiral gear 353 which is fixed to the jack shaft 28 (Figs. 25 and 26).

Lug feeding mechanism

The lug feeding mechanism comprises a pair of upper and lower pinch rolls 354 and 355 (Fig. 42), which are adapted to be intermittently rotated at the same peripheral speed and draw a strip of relatively heavy paper or other suitable material from a supply roll 356 which is rotatably mounted on the housing 15 (Fig. 9). The lower roll 355 is fixed to a shaft 357 (Fig. 42), which is journalled in bearings 358 formed on the frame 348. This roll is intermittently rotated by means of a pawl 359 which is pivotally mounted on an arm 360 for engagement with a ratchet wheel 361 which is also fixed to the shaft 357. The arm 360 (Figs. 41, 42 and 43), is mounted for free angular movement on the shaft 357 and is swung downwardly to advance the feed roller one step by a vertically extending link 362 which is pivotally connected at its lower end to a lever 363. A spring 363' connects the arm 360 to the frame 348 and returns the arm and pawl to their initial positions at the conclusion of the feeding stroke. The lever 363 is mounted on a shaft 364 (Figs. 41 and 42), fixed in bearings 365 formed on the frame 348 and the lever is provided with a roller 366 for engagement with a cam 367 fixed to the cam shaft 349.

The upper paper feed roll 354 is fixed to a shaft 368 journalled in floating bearing blocks 369 (Fig. 42), which are mounted for vertical sliding movement in slots 370 provided in the frame 348. This roll is resiliently urged toward the roll 355 in order to yieldably grip the strip or ribbon of paper, by means of coiled springs 371 disposed in apertures 372 formed in the frame 348. These springs bear against the bearing blocks 369 and the pressure exerted thereby may be regulated by means of screws 373 threaded into the frame 348 for engagement with spring followers 374 slidably mounted in the apertures 372 adjacent to the upper ends of the springs 371.

The upper roller 354 is driven by a gear wheel 375 (Figs. 41, 42 and 43), fixed to the shaft 368 for intermeshing engagement with a gear wheel 376 of corresponding size fixed to the shaft 357 of the lower feed roll 355.

Lug severing mechanism

After passing between the rolls 354 and 355 the paper is fed along a support 377 (Figs. 42 and 43) to the severing mechanism which comprises a cutter head 378 mounted for vertical reciprocation in guideways 379 provided in the frame 348. An upper cutter blade 380 is fixed to the head 378 for cooperating with a lower cutter blade 381 fixed to the forward edge of the support 377. A pair of springs 382 are carried by the head 378 and are adapted to yieldably support the cutter head. A bar 383 is carried by the cutter head for yieldable engagement with the paper in advance of the blade 380 and maintains it against displacement during the severing operation. The cutter head 378 and the blade 380 carried thereby are reciprocated in timed relation to the intermittent feed of the paper along the support 377 so as to perform the severing operation during a period of dwell in the movement thereof, by means of links 384. These links are pivotally connected at their upper ends to the cutter head 378 at each side thereof and at their lower extremities to arms 385 (Figs. 41 and 42), which are journalled on the fixed shaft 364 and which are provided with rollers 386 for engagement with cams 387 fixed to the cam shaft 349.

Lug positioning mechanism

As the paper is fed over the support its front edge enters spiral grooves 388 provided in a pair of lowering members 389 (Figs. 42 to 47) which support the lug after it is severed from the parent body of paper. These members are fixed to the lower extremities of shafts 390 which are mounted for rotary and vertical sliding movement in bearings 391 and pairs of lugs 392 formed on the frame 348. The shafts 390 are reciprocated in order to lower the lugs to the level of the path of movement of the pockets along the rails 280 and 281, by means of levers 393 which are fixed to a rock shaft 394 and the outer ends of which are connected to swivels 395 in which the upper ends of the shafts 390 are journalled. The shaft 394 extends above the unit and is journalled in bearings 396 which are formed on brackets 397 carried by the frame 348. An arm 398 is also fixed to one end of the shaft 394 and is connected to an arm 399 of a bell crank lever 400 by means of a link 401. A roller 402 is provided on the arm 399 for engagement with a cam 403 fixed to the cam shaft 349. A roller 404 is also provided on the other arm 405 of the lever 400 for engagement with a cam 406 also fixed to the shaft 349. These cams reciprocate the shafts 390 in both directions.

At the conclusion of the downward movement of the members 389 the shafts 390 are rotated 180° in order to release the lug from the grooves 388 and to deposit the lug on a table or support 407 and in a position to be conveyed and delivered to the stitching devices. This motion is imparted to the shafts 390 by a rack bar 408 (Figs. 43 and 48) which is mounted for horizontal reciprocation in slide bearings 409 formed in the lugs 392. This rack bar meshes with gear wheels 410 (Figs. 43 and 48), which are splined to the shafts 390 between the lugs or ears 392. A lever 411 (Figs. 41 and 42), is pivotally connected at its upper end to the outer extremity of the rack bar 408 and is pivotally mounted at its lower end in the outer extremity of the fixed shaft 364. This lever is provided with a roller 412 for engagement by a cylindrical cam 413 which is fixed to the cam shaft 349. As the members 389 are thus rotated they pass over the lug and hold it momentarily firmly against the support 407 and steady it before again returning to their initial elevated position (Fig. 47).

The lug is pushed along the support 407 by means of a pusher bar 414 to a position in which it underlies the edge of the pocket supported by the carrier 278. During this movement the ends of the lug project into under-cut recesses provided in a pair of guide bars 415 and 416 (Figs. 42, 43, 45 and 47), which maintain the lug against vertical and lateral displacement and which guide the lug accurately beneath the edge of the pocket. The bar 415 is rigidly secured to the support 407 but the coacting bar 416 is carried by arms 417 which are pivotally mounted beneath the support and which project upwardly through slots 418 (Fig. 43), formed therein. These levers are urged inwardly by springs 419 (Fig. 43) so as to cause the bar 416 to exert a slight pressure against the end of the lug and to exert a retarding influence to the movement of the lug along the support which tends to maintain it in proper alignment. The pusher bar 414 is recessed as at 420 to permit of its passage over the guide bars 415 and 416 and is provided at its ends with depending slides 421. These slides extend into grooves 422 formed in the sides of the support 407 and guide the pusher bar in its travel therealong. The pusher bar is reciprocated by means of a pair of bell crank levers 423 (Figs. 41 and 42), which are arranged one on each side of the frame 348 and journalled on the fixed shaft 364. The arms 424 of the levers 423 are connected to the slides 421 by links 425 and are provided with rollers 426 for engagement with cams 427 fixed to the cam shaft 349. The other arms 428 of these levers extend forwardly and are connected to the frame 348 by springs 429. By means of this construction the pusher bar is moved on its forward or feeding stroke by the positive action of the cams 427 but is returned to its initial position by the springs 429.

A knock-out bar 430 (Figs. 42, 43, 49 and 50), is mounted for vertical movement in a frame 431 which is secured to the edge of the support 407. This bar is yieldably supported by springs 432 in a position slightly above the level of the support 407 and is provided with a lug 433 at each end thereof for engagement by cams 434 formed on the slides 421. As the pusher bar approaches the limit of its feeding stroke the cams 434 engage above the lugs 433 and depress the bar 430 to the level of the support 407 to permit the lug to pass above it. At this moment a lock bar 435, mounted for sliding movement in the frame 431, is thrust forwardly through an elongated aperture 436 provided in a depending lug 437 formed on the bar 430 and prevents the bar from rising when the cams 434 move out of engagement with the lugs 433 upon the return stroke of the pusher bar. The lock bar 435 is reciprocated by a lever 438 which is journalled on the shaft 364 and is provided with a roller 439 (Figs. 41 and 42), for engagement with a cam 440 fixed to the cam shaft 349.

The lug is maintained in a position overhanging the bar 430 during the stapling operation by means of suction applied through apertures 441 provided in the support 407 adjacent to the forward edge thereof (Fig. 50). These apertures communicate with pipes 442 leading to a valve casing 443 which is mounted on the frame 348 (Fig. 41). The valve casing 443 is provided with a slide valve 444 which is normally maintained closed by a spring 445 but which is opened periodically by a cam 446 fixed to the cam shaft 349 (Fig. 51).

Lug stapling and creasing mechanism

As soon as the lug is positioned beneath the edge of the partially completed pocket it is permanently secured thereto by means of the lug stapling unit E. This unit comprises a frame 447 provided with bearings 448 on its upper portion mounted on a horizontal shaft 449 fixed in a bearing 450 formed on the frame 348 (Figs. 42 and 43). The entire unit may thus be swung upwardly to provide access to the stitching devices for adjustment or repair but which is secured to the frame 348 when it occupies an operative position by means of screws 451. A horizontally disposed drive shaft 452 (Figs. 41, 42 and 43), is journalled in a bearing 453 formed on the upper portion of the frame 348 and is intermittently rotated by a pulley 454 which is mounted for free rotation on the outer end thereof but which is periodically connected thereto by means of suitable clutch mechanism of well known commercial type, not shown. This pulley is constantly rotated by a belt 455 which is driven by a pulley 456 fixed to the main drive shaft 20 (Figs. 9 and 10).

A plurality of stapling devices, in the present instance, four in number, are secured to the frame 447 in overhanging relation to the pocket and lug. These devices are similar to those employed in the sheath or tip attaching unit, hereinbefore described, and each briefly comprises a stationary member 457 (Figs. 41 and 42), and a vertically reciprocable member 458 (Fig. 42), which forms the staples from wire supplied thereto from rolls 459 carried by the frame 447 and forces them through the paper and lug. The members 458 are actuated by means of a plate 460 to which they are secured and which is mounted for vertical sliding movement in guideways 461 formed in the frame 447. This plate is reciprocated by a crank 462 which is provided on the end of the drive shaft 452.

A plurality of clincher members 463 are mounted for vertical reciprocation on the support 407 for cooperation with the movable members 458. These members are pivotally connected at their lower ends to one side of a substantially rectangular frame 464 which is journalled at its ends on a shaft 465 fixed in bearings 466 formed on the frame 348. The frame 464 is rocked on the shaft 465 by a rod 467 (Fig. 42), which is secured at its lower end to an extension 468 provided on the other side of the frame and which carries a roller 469 at its upper end for engagement with a cam 470 fixed to the drive shaft 452.

The clutch mechanism is actuated periodically to connect and disconnect the constantly rotating pulley 456 and the drive shaft 452 in order to intermittently actuate the stapling devices in timed relation to the movement of the paper, by means of a lever 471 fixed to one end of a rock shaft 472. This shaft 472 is journalled in the bearing 453 (Fig. 42) and has an arm 473 fixed thereto at its other end. A link 474 (Figs. 41, 42 and 43), is connected at its upper end to the arm 473 and at its lower end to an arm 475 of a bell crank lever 476 journalled on the fixed shaft 364. The other arm 477 of this lever is provided with a roller 478 for engagement with a cam 479 which is fixed to the cam shaft 349.

On the downward movement of the plate 460 which actuates the stapling device the movable members 458 first engage the pocket and lug and forces the staples therethrough. This movement of the plate 460 also carries a pair of screws 480, which are threaded into brackets 481 mounted thereon, into engagement with the upper ends of a pair of rods 482. These rods are mounted for vertical sliding movement in a pair of blocks 483 which are secured to the face of the frame 457 and carry a horizontally disposed creaser bar 484 at their lower extremities. The bar 484 is supported by means of springs 485 which are secured at their lower ends to the rods 482 and at their upper ends to the blocks 483. Substantially simultaneously with the stapling operation the continued downward movement of the plate 460 depresses the bar 484 against the action of the springs 485 into engagement with the paper and creases it over the edge of the support 407. During this creasing operation the knock-out bar 430 moves downwardly under the pressure exerted by the creaser bar 484 and against the action of the springs 432. It will be noted at this point that although the lock bar 435 is extending through the elongated aperture 436 at this time, there is sufficient clearance between the bar and the top of the aperture to permit of this slight depression of the knock-out bar.

Upon the upward movement of the stitching devices and the creaser bar 484 at the conclusion of the stitching operation, the cam 440 withdraws the lock bar 435 from the aperture 436 and permits the springs 432 to elevate the knock-out bar to its initial position and the completed pocket from engagement with the edge of the support 407.

The suction applied to the carrier 278 is now released and the carrier 279 conveys the pocket to the grouping unit, the carrier 278 at the same time returning to an operative position adjacent to the separating unit.

*Folding and grouping mechanism*

Figure 52:
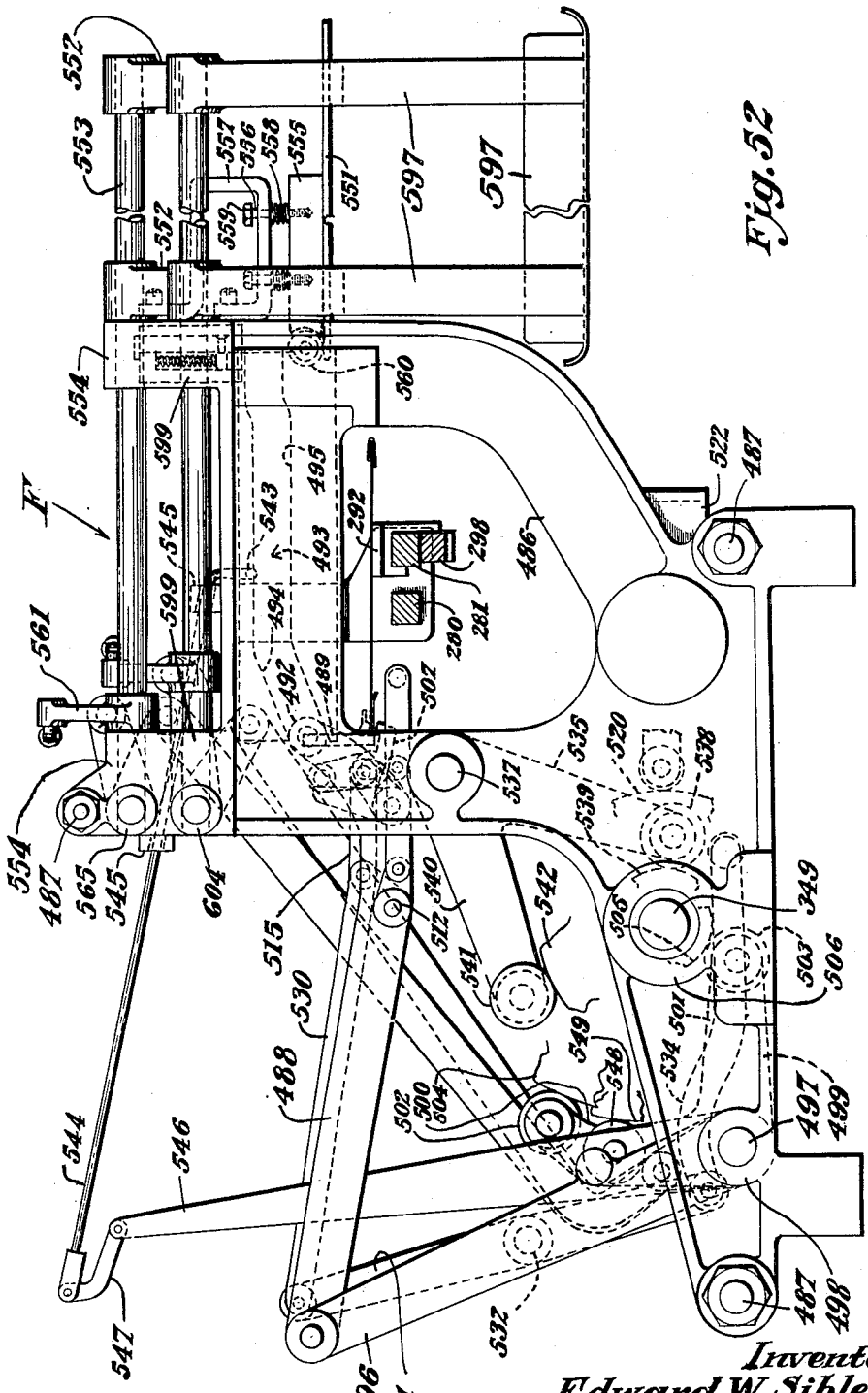
Fig. 52 is an end elevational view taken from the feed end of the machine and illustrating the pocket creasing and stacking unit.

The folding and grouping mechanism comprises a pair of side frames 486 mounted on the bed 14 and connected by tie rods 487 (Figs. 52 and 53). A pair of bars 488 (Figs. 52 and 59), extend substantially horizontally adjacent to each of the frames 486 and are connected at their forward ends by a transverse bar 489 which is formed with a horizontally extending lip or jaw portion 490 and a downwardly extending shoulder portion 491 (Figs. 56 to 59). The bars 488 are formed with outwardly extending bosses 492 at their forward ends for engagement with grooves or tracks 493 provided in the inner faces of the frames 486 and each formed with an inclined portion 494 and a horizontal portion 495 (Figs. 52 and 56–59).

Figure 54:
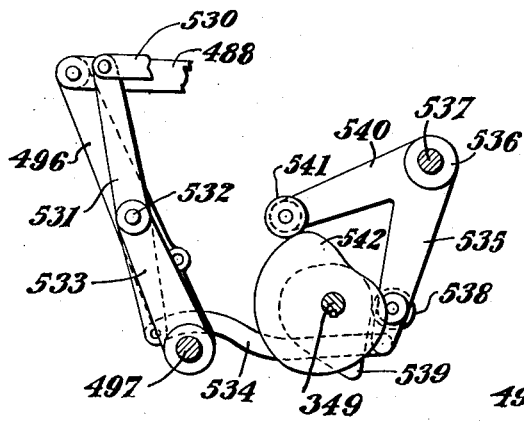
Fig. 54 is a detail sectional view taken on line 54—54 of Fig. 53, and illustrating the mechanism for operating the pocket delivering and stacking device.
Figure 55:
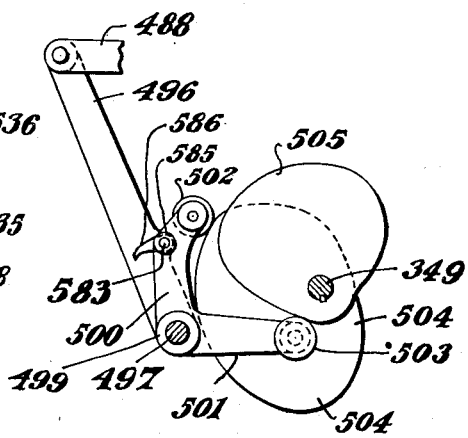
Fig. 55 is a view similar to Fig. 54 taken on line 55—55 of Fig. 53.

The bars 488 and bar 489 carried thereby are reciprocated in the tracks 493 in a direction transverse to the path of movement of the carrier 279 by means of upwardly extending arms 496 (Figs. 52, 54 and 55). These arms are pivotally connected at their upper ends to the rear extremities of the bars 488 and are fixed at their lower ends to a rock shaft 497 journalled in bearings 498 formed in the frames 486. A bell crank lever 499 is fixed to the shaft 497 and the arms 500 and 501 thereof are provided with rollers 502 and 503 for engagement with a pair of conjugate cams 504 and 505 respectively. These cams are fixed to an extension of the cam shaft 349 journalled in bearings 506 formed in the side frames 486.

A lower jaw member 507 extends parallel to the jaw 490 for cooperation therewith and is provided at each end with an arm 508 pivotally mounted on the adjacent bar 488 at 509. These arms extend upwardly and are provided with transversely extending pins 510 connected by means of springs 511 to a transversely extending rock shaft 512 journalled at its ends in the bars 488. This shaft has an arm 513 fixed to each end thereof and a bifurcate arm 514 fixed thereto intermediate of its length connected by a link 515 to a similarly shaped arm 516 fixed to a rock shaft 517 extending parallel to the shaft 512 and also journalled at its ends in the bars 488. A bell crank lever 518 is fixed to each end of the shaft 517 and is provided with an upwardly extending arm 519 adapted to engage the pin 510 in the adjacent arm 508 and to maintain the lower jaw 507 out of operative relation with the upper jaw 490 when these jaws are not functioning to hold the lug and pocket.

Figure 61:
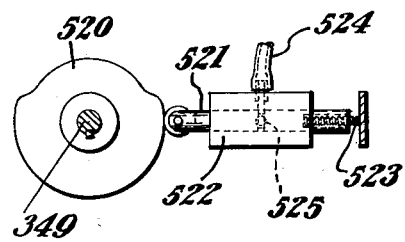
Fig. 61 is a detail sectional view taken on line 61—61 of Fig. 53 and illustrating the air controlling valve of the pocket transfer device illustrated in Fig. 31.

The operation of the mechanism is so timed that at the commencement of the forward movement of the bars 488 and while the pocket is held by suction in position on the carrier 279, the shoulder 491 first contacts with the edge of the lug and bows the pocket upwardly to a slight extent (Fig. 57). This is to insure that the pocket is positioned accurately with respect to the jaw members prior to being gripped thereby and with the major dimension thereof extending at right angles to its path of travel. Following this movement, the lower jaw member 507 engages the lug and clamps it securely against the upper jaw member 499. At this stage in the operation of the device the pocket is released from the carrier 279 permitting it to spring back to its original flat condition. This is accomplished by means of a cam 520 fixed to the cam shaft 349 (Figs. 52, 53 and 61) for engagement with a valve stem 521 of a valve 522 carried by one of the side frames 486 and which controls communication between the interior of the carrier 279 and the source of reduced pressure. The valve stem 521 is urged by a spring 523 to a position in which it establishes communication between a pipe 287 leading to the interior of the carrier 279 and a pipe 525 leading to the source of reduced pressure. At the proper time, however, the cam 520 shifts the valve stem 521, against the action of the spring 523, to a position in which it interrupts communication with the source of reduced pressure and establishes communication between the interior of the carrier 279 and the outer atmosphere through an exhaust port 526, thus releasing the pocket from the carrier 279 which had held it during the preceding operations.

As soon as the pocket is released from the carrier 279 it is elevated therefrom by the upward motion of the jaws caused by the bosses 490 provided on the forward end of the bars 488 traversing the inclined portions 494 of the tracks 493. This upward movement of the parts is provided primarily to permit the pocket carrying mechanism to pass over the rails 280 and 281 and the carrier 279 in conveying the pocket to the grouping mechanism.

A folding bar 527 extends parallel to and in advance of the jaws 490 and 507 slightly below the level of the pocket and is mounted at the ends thereof in bars 528 which are pivotally connected to the arms 529 of the bell crank levers 518 and to the arms 513 fixed to the outer ends of the shaft 512 and function to fold the pocket along the line of the perforations 8 in a manner presently to be described. The shafts 512 and 517 are rocked simultaneously with the reciprocation of the bars 488 in order to raise and lower the jaw member 507 and to actuate the folding bar 527, by means of a pair of parallel links 530 pivotally connected to each side of the arm 514 at their forward ends and at their rear ends to the upper extremity of a lever 531 (Figs. 52 and 53). This lever is pivotally mounted at 532 intermediate of its length on the upper end or an arm 533 which is fixed to the rock shaft 497. The lower end of the lever 531 is pivotally connected to one end of a link 534 (Figs. 52, 53 and 54), connected at its other end to an arm 535 of a bell crank lever 536 mounted on a shaft 537 journalled in the frames 486. A roller 538 is provided on the arm 535 of the bell crank lever 536 for engagement with a cam 539 fixed to the cam shaft 349 and the other arm 540 thereof is provided with a roller 541 for engagement with a complementary cam 542 also fixed to the cam shaft 349.

The contours of the cams 539 and 542 are such that as the arms 496 and 533 swing forwardly, the lever 531 carried by the arm 533, will swing about its pivot 532 in a counter-clockwise direction, as viewed in the several figures, and rock the shafts 512 and 517 also in a similar direction through the medium of the links 515 and 530 and the arms 514 and 516. This movement of the shafts first causes the bell crank levers 518 to also swing in a counter-clockwise direction and carry the arms 519 out of engagement with the pins 510, thus permitting the lower jaw member 507 to close and grip the lug under the action of the springs 511 (Fig. 57). Following this movement of the jaw 507, the continued rotation of the shafts 512 and 517 carries the bar 527 into engagement with the lower face of the pocket and folds it rearwardly over the upper jaw member 490 to form an initial crease along the line of the perforations 8 (Fig. 58).

Figure 60:
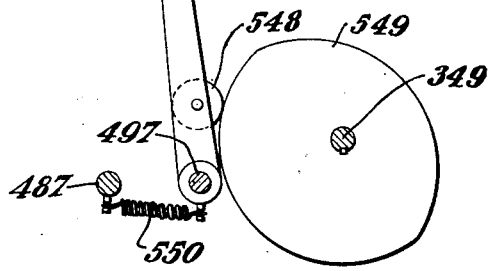
Fig. 60 is a detail sectional view taken on line 60—60 of Fig. 53.

At the conclusion of this folding operation and during the continued forward motion of the bars 488 and jaws carried thereby, the cams 539 and 542 swing the lever 531 in a clockwise direction relative to the arm 496 and return the creaser bar 527 to its initial position below the level of the pocket. At this stage in the operation of the device, a transversely extending bar 543 moves forwardly and bends the pocket back to substantially its original position. This bar is carried by a rod 544 slidably mounted in guides 545 formed on the frame and is connected at its rear extremity to the upper end of a lever 546 by means of a link 547 (Figs. 52, 53 and 60). This lever is mounted for free relative oscillation on the rock shaft 497 and is provided with a roller 548 for engagement with a cam 549 fixed to the cam shaft 349. A spring 550 connects the lower end of this lever to a tie rod 487 of the frame and maintains the roller 548 in operative engagement with the cam 549. By means of this construction the bar 543 is thrust forwardly, for the purpose mentioned, by the yieldable action of the spring 550 and is retracted by the positive action of the cam 549, thus preventing injury to the mechanism in the event that a pocket should for any reason become jammed.

*Nesting and grouping device*

Figure 66:
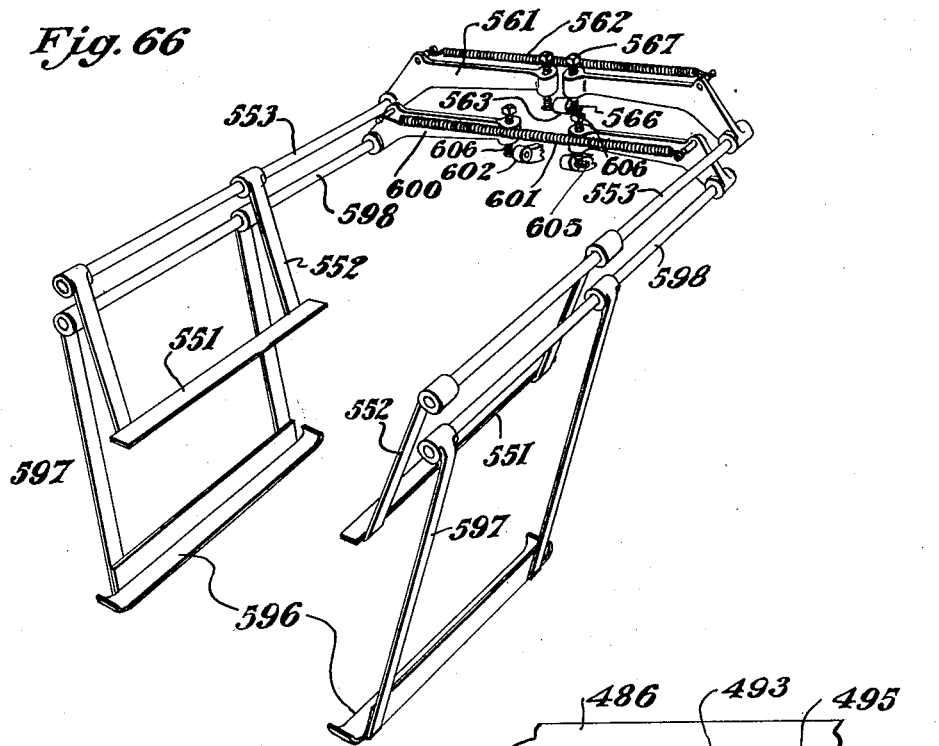
Fig. 66 is a fragmentary perspective view of the pocket delivering mechanism of the creasing and stacking unit.
Figure 56:
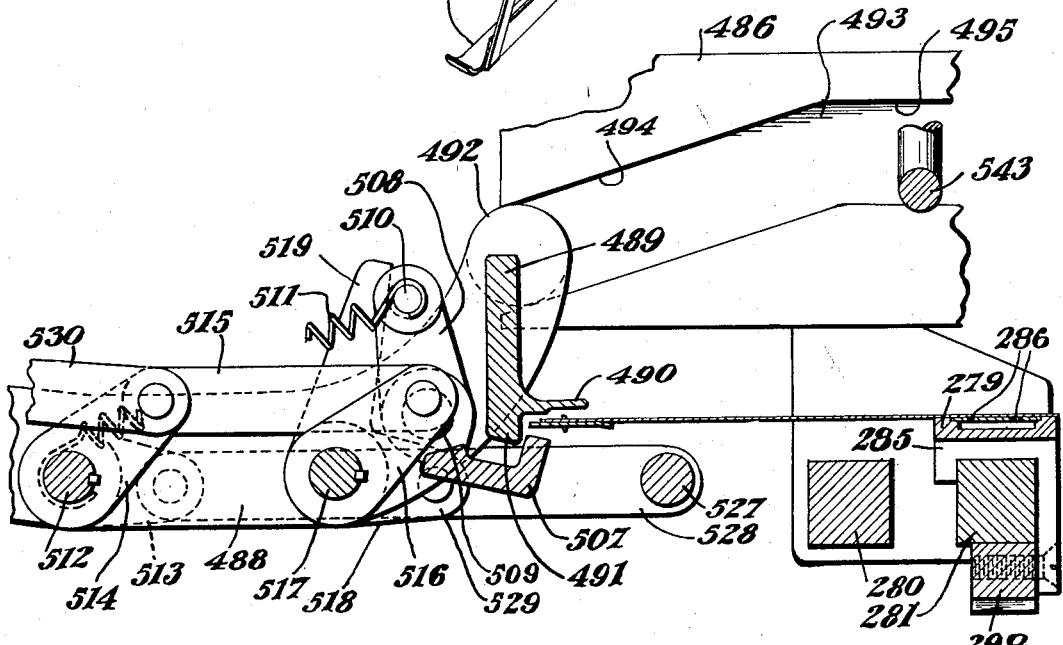

As the jaws move forwardly they carry the pocket over a pair of horizontal supports 551 (Figs. 52, 53 and 66), arranged in parallel relation to each other adjacent to the edges of the pocket and upon which it is deposited when released from the jaws. These supports are carried by depending bars or straps 552 fixed at their upper ends to a pair of parallel horizontally extending rock shafts 553 journalled in bearings 554 provided on the side frames 486. The pockets are delivered to the supports 551 successively and are adapted to overlie the next preceding pocket with the offset portions 10 of the lug of the succeeding pocket extending beneath the lug of the preceding pocket (Fig. 59). In order to insure that the pockets are so positioned when released by the jaws, a pair of pressure bars 555 are arranged one on each side of the pockets and in proximity to the supports 551. These bars are provided with upwardly extending pins 556 (Fig. 52) which slidably engage apertures provided in brackets 557 secured to the frames 486. These bars are yieldably urged downwardly against the supports 551 by springs 558 which encircle the pins 556 between the upper face of the bars and the brackets 557 and are prevented from becoming displaced when the supports are removed, as will presently be described, by nuts 559 threaded over the upper extremities of the pins 556 above the brackets 557. A roller 560 is mounted on the rear end of each of the bars 555 and are adapted to first be engaged by the ends of the lugs as the pockets are delivered to the supports, and to guide them between the supports 551 and the bars 555 and into nested relation with the preceding pocket (Fig. 59).

The supports 551 are swung toward and away from each other by means of a pair of inwardly extending levers 561 (Figs. 53 and 66) fixed to the shafts 553 and yieldably maintained in operative position by means of a spring 562 connected at its ends to each of the levers 561 intermediate of its length. A lever 563 is fixed to a rock shaft 564 journalled in bearings 565 formed in the frames 486 and is provided with a transversely extending pin 566 for engagement with adjustment screws 567 threaded into the inner extremities of the levers 561. A lever 568 is also fixed to the shaft 564 and is pivotally connected to the upper end of a downwardly extending L-shaped link or bar 569 the lower end of which is pivotally connected to an arm 570 of a bell crank lever 571 (Fig. 62). This lever is mounted for free oscillatory motion on the shaft 497 and the other arm 572 thereof is provided with a hub 573 in which a pin 574 is secured and which also carries an adjustable stop screw 575.

The pin 574 is formed with a squared portion 576 for engagement by a pair of pawls 577 and 578 mounted on a shaft 579 and urged toward the pin 574 by springs 580 and 581. Spring 580 is shown in Fig. 62 while spring 581 in this view is directly behind spring 580. Both springs 580 and 581 are shown in Fig. 53. The pawl 577 is provided with an upwardly extending finger portion 582 adapted to be engaged by a shaft 583 rotatably mounted in bearings 584 and 585 formed in one of the arms 496 and the arm 500 of the bell crank lever 499, and to be lifted thereby out of engagement with the pin 574 upon each forward or pocket delivering movement of these arms. A pawl 586 is fixed to the shaft 583 for engagement with a ratchet wheel 587 rotatably mounted on the shaft 497 and maintained against backward rotation by a locking pawl 588. An arm 589 is also fixed to the shaft 583 and is provided with a roller 590 for engagement with a cam 591 carried by one of the frames 486 (Fig. 64) and maintains the pawl 586 out of engagement with the ratchet wheel 587 except as it approaches the limit of its return stroke, thus insuring that the pawl will only advance the ratchet wheel one tooth notwithstanding the relatively large arc traversed thereby during the oscillation of the arms. A spring 592 is secured at its ends to the arm 589 and the arm 496 and urges this arm toward the cam 591 and the pawl 586 toward its cooperating ratchet wheel 587.

A plurality of pins 593 are arranged in spaced relation on one of the faces of the ratchet wheel 587 for successive engagement with a cam 594 provided on the pawl 578 and are adapted to periodically lift this pawl out of engagement with the pin 574. It will thus be apparent that each time a pocket is transferred from the carrier 279 to the supports 551, the ratchet wheel 587 will be advanced one tooth and that as soon as a predetermined number of pockets, governed by the number of ratchet teeth occurring between the pins 593, have been so transferred, a pin 593 will lift the pawl 578 out of engagement with the pin 574 and hold it in such position until the shaft 583 on the next succeeding forward movement engages the finger 582 of the pawl 577 and lifts this pawl also from engagement with the pin 574. When this occurs the bell crank lever 571 is released and permits the spring 562 to swing the supports 551 apart and release the group of nested pockets delivered thereto.

On the return stroke of the levers 496 and 500 the pawl 586 advances the ratchet wheel 587 one tooth which is sufficient to carry the pin 593 out of engagement with the cam 594 and permit the pawl 578 to drop into the path of movement of the pin 574. Upon the next forward or feeding stroke of the levers 496 and 500 the shaft 583 engages the adjustable abutment screw 575 and swings the bell crank lever 571 in a clockwise direction, as viewed in Fig. 62 back to its initial position. This movement of the lever 571 swings the supports 551 back to their original pocket receiving position against the action of the spring 562. As the pin 574 approaches the limit of its travel in this direction it engages a cam surface 595 provided on the extremity of the pawl 578 (Fig. 63) and lifts this pawl sufficiently to permit it to drop into engagement with the squared portion 576 thereof. It will be noted that the number of pockets nested together in a single group is determined by the number of teeth between the pins 593. In the present instance there are four groups of eleven each and one group of eight which insures that for one complete rotation of the ratchet wheel 587, there will be four groups of eleven pockets each and one group of eight pockets delivered to the supports 551, the pockets of each group being nested together.

When the groups of pockets are successively released by the supports 551 they fall directly upon a second pair of supports 596 arranged directly therebeneath in parallel relation to each other. These supports are carried by depend bars or straps 597 fixed at their supper ends to a pair of parallel rock shafts 598 which extend beneath the shafts 553 and parallel thereto and are also journalled in bearings 599 provided on the frames 486. The supports 596 are also swung toward and away from each other, similarly to the supports 551, by means of a pair of inwardly extending levers 600 fixed to the shafts 598 and yieldably maintained in operative position by means of a spring 601 connected at its ends to each of the levers 600 intermediate of their length.

A pair of arms 602 are fixed to a rock shaft 603 journalled in bearings 604 formed in the frame 486 and are each provided with a transversely extending pin 605 in their ends for engagement with adjustment screws 606 threaded into the ends of the levers 600. A lever 607 is also fixed to the shaft 603 and is pivotally connected to the upper end of another L-shaped link or bar 608 (Figs. 62 and 65) which extends downwardly adjacent to the link 569 and is pivotally connected at its lower end to an arm 609 of a bell crank lever 610. This lever is mounted for free oscillation on the rock shaft 497 and the other arm 611 thereof is provided with a hub 612 in which a pin 613 is secured and which also carries an adjustable stop screw 614. The pin 613 is also formed with a squared portion 615 for engagement with a pair of pawls 616 and 617 pivotally mounted on the shaft 579 adjacent to the pawls 577 and 578 and which are urged toward the pin 613 by springs 618 and 619 respectively. In Fig. 65, spring 619 is directly behind spring 618, but both springs are shown in Fig. 53. The pawl 616 is provided with an upwardly extending finger portion 620 adapted to be engaged by the shaft 583 upon each forward or pocket delivering movement of the arms 496 and 500 and force the pawl 616 out of engagement with the pin 613. A single pin 621 is secured to the face of the ratchet wheel 587 opposite to that carrying the pins 593 for engagement with a cam 622 formed on the pawl 617 and lifts this pawl out of engagement with the pin 613 upon every complete rotation of the ratchet wheel 587. It will be apparent from the foregoing, that although the pawl 616 is lifted out of engagement with the pin 613 upon every forward movement of the pocket delivering devices, the pawl 617 is only lifted from engagement with this pin, when the pin 621 engages the cam 622. When this occurs the next forward movement of the arms 496 and parts actuated thereby, disengages the pawl 616 from the pin 613 while the pawl 617 is being held in an inoperative position by the cam 622 and permits the spring 601 to swing the supports 596 apart and releases the stack of groups of nested pockets that have been successively deposited thereon from the supports 551. The stack of pockets thus released fall upon a suitable table or endless belt, not shown, for subsequent assembly in the trays of a Kardex filing system.

Following the release of the stack of pockets by the supports 596, the next forward swing of the arms 496 and 500 carries the shaft 583 into engagement with the stop screw 614 and swings the bell crank lever 610 back to its initial position. This movement of the lever 610 swings the supports 596 back to their pocket receiving position against the action of the spring 601. As the pin 613 approaches the limit of its travel in this direction it engages a cam surface 623 provided on the extremity of the pawl 617 and lifts this pawl sufficiently to permit it to drop into engagement with the squared portion 615 thereof.

It will be noted that the trip pin 621 is offset radially with respect to the trip pins 593 and consequently the upper supports 551 can only separate to discharge a group of pockets when the lower supports 596 are in position to receive the same.

The invention hereinabove described may be modified in construction, arrangement and method of application without departing from the scope of the invention as defined in the appended claims.

What is claimed is:

1. The method of making pockets for card index or filing systems which comprises perforating a strip of paper to provide card retaining apertures therein, attaching a card retaining strip to an edge of said paper and severing said paper and attached card retaining strip into sections of predetermined length.

2. The method of making pockets for card index or filing systems which comprises perforating one portion of a strip of paper or other material to provide card retaining apertures therein, attaching a card retaining strip to another portion of said paper spaced from the apertured portion and severing said paper and attached card retaining strip into sections of predetermined length.

3. The method of making pockets for card index or filing systems which comprises attaching a card retaining strip to a strip of paper or other material, severing said paper and attached retaining strip into sections of predetermined length, attaching a pocket retaining member to the sections thus severed, folding the section along a predetermined line to form a hinge, and stacking said sections together in groups of predetermined number, said operations occurring in a regular cyclic order and in timed relation with respect to each other.

4. The method of making pockets for card index or filing systems which comprises attaching a card retaining strip to a strip of paper or other material, severing said paper and attached retaining strip into sections of predetermined length, attaching a pocket retaining member to the sections thus severed, bending said member to provide an offset therein, folding the section along a predetermined line to form a hinge, and stacking said sections together in groups of predetermined number with the edges of said members nesting within the offset portions of adjacent members, said operations occurring in a regular cyclic order and in timed relation with respect to each other.

5. The method of making pockets for card index or filing systems which comprises simultaneously perforating a strip of paper or other material to provide card retaining apertures therein, attaching a card retaining strip to a portion of said strip of paper previously perforated, severing from said strip a section thereof of predetermined length previously perforated and having said card retaining strip secured thereto, and attaching a pocket retaining member to said section.

6. The method of making pockets for card index or filing systems which comprises simultaneously perforating a strip of paper or other material to provide card retaining apertures therein, attaching a card retaining strip to a portion of said strip of paper previously perforated and severing from said strip a section thereof of predetermined length previously perforated and having said card retaining strip secured thereto, attaching a pocket retaining member to said section, and bending said member to provide an offset therein.

7. The method of making pockets for card index or filing systems which comprises simultaneously perforating a strip of paper or other material to provide card retaining apertures therein, attaching a card retaining strip to a portion of said strip of paper previously perforated and severing from said strip a section thereof of predetermined length previously perforated and having said card retaining strip secured thereto, attaching a pocket retaining member to said section, bending said member to provide an offset therein and stacking said sections together in groups of predetermined number with the outer edges of said members nested within the offset portions of the adjacent members.

8. An apparatus for making pockets for index or filing systems which comprises, a securing device, means for feeding a strip of paper or other material to said device, means for positioning a strip of transparent material along an edge of said paper, means for actuating said securing device to attach said strip of transparent material to said paper at intervals, and means for simultaneously severing said paper and attached transparent material into sections of predetermined length.

9. An apparatus for making pockets for index or filing systems which comprises a stapling device, means for intermittently feeding a strip of paper or other material to said device, means for guiding a folded strip of transparent material into a position along an edge of said paper and for separating the folded portions thereof to engage opposite sides of said paper, means for actuating said device to permanently unite said strip of transparent material and said paper, and means for simultaneously severing said paper and attached strip of transparent material into sections of predetermined length.

10. An apparatus for making pockets for index or filing systems which comprises a stapling device, means for feeding sections of a strip of flexible material and a card retaining strip intermittently to said device, means for actuating said device to intermittently secure said sections of the strips together successively, and means for severing simultaneously with the operation of the last-named means, attached sections of said strips from the remaining portions of the strips.

11. An apparatus for making pockets for index or filing systems which comprises, a stapling device, means for feeding a strip of paper or other material to said device, means for positioning a strip of transparent material along an edge of said paper, means for actuating said stapling device to attach said strip of transparent material to said paper at intervals, and means for simultaneously severing sections of said paper with attached transparent material from the remaining portions of said strips.

12. An apparatus for making pockets for index or filing systems which comprises a stapling device, means for intermittently feeding a strip of paper or other material to said device, means for guiding a folded strip of transparent material into a position along an edge of said paper and for separating the folded portions thereof to engage opposite sides of said paper, means for actuating said device to permanently unite said strip of transparent material and said paper, and means for simultaneously severing said paper and attached strip of transparent material into sections of predetermined length.

13. Apparatus for making pockets for index or filing systems comprising means for feeding a strip of paper or other material continuously from a source of supply, means for fabricating said strip into a pocket, means for intermittently feeding the strip thus continuously fed by said continuous feeding means to said pocket fabricating means at a slower rate, a roller for maintaining the strip fed by said continuous feeding means under tension during the periods of dwell in the operation of said intermittent feeding means, and means engaged and actuated by said roller for stopping operation of said continuous feeding means when the amount of paper fed thereby exceeds that fed by said intermittent feeding mechanism a predetermined amount and for starting said continuous feeding means after the excess paper is reduced to a predetermined minimum amount.

14. Apparatus for making pockets for index or filing systems comprising means for feeding a strip of paper or other material continuously from a source of supply, means for fabricating said strip into a pocket, means for intermittently feeding the strip thus continuously fed by said continuous feeding means to said pocket fabricating means at a slower rate, a bodily movable roller for maintaining the strip fed by said continuous feeding means under tension during the periods of dwell in the operation of said intermittent feeding means, and means engaged and actuated by said roller for stopping operation of said continuous feeding means when the amount of paper fed thereby exceeds that fed by said intermittent feeding mechanism a predetermined amount.

15. Apparatus for making pockets for index or filing systems comprising an attaching device, means for feeding a plurality of strips of paper or other material to said device, and means actuated by one of said strips for discontinuing the operation of the machine if the feed thereof is retarded.

16. Apparatus for making pockets for index or filing systems comprising an attaching device, means for feeding a plurality of strips of paper or other material to said device at different rates of speed, and means actuated by one of said strips for discontinuing the operation of the machine when the feed thereof lags the other a predetermined amount.

17. Apparatus for making pockets for index or filing systems comprising an attaching device, means for feeding a strip of paper or other material to said device, means for feeding a strip of celluloid to said device, and means actuated by said strip of celluloid for discontinuing the operation of the machine upon the retardation of the feed thereof a predetermined amount.

18. Apparatus for making pockets for index or filing systems comprising an attaching device, means for feeding a plurality of strips of paper or other material to said device, a switch for controlling the operation of said apparatus, electromagnetic means for opening said switch, and means actuated by one of said strips for energizing said electro-magnetic means to open said switch and discontinue operation of the machine if the feed thereof is retarded a predetermined amount.

19. Apparatus for making pockets for index or filing systems comprising means for feeding a strip of paper or other material continuously from a source of supply, means for fabricating said strip into a pocket, means for intermittently feeding the paper thus continuously fed by said continuous feeding means to said pocket fabrication means at a slower rate than the continuous feed thereof, mechanism for periodically discontinuing the operation of said continuous feeding means when the difference between the amount fed thereby and by said intermittent feeding means exceeds a predetermined amount and for continuing the operation thereof when said difference is reduced a predetermined amount, and means for automatically discontinuing the operation of the entire machine in the event that said continuous feeding means fails to supply sufficient paper to said intermittent feeding means.

20. Apparatus for making pockets for index or filing systems comprising means for feeding a strip of paper or other material continuously from a source of supply, means for fabricating said strip into a pocket, means for intermittently feeding the paper thus continuously fed by said continuous feeding means to said pocket fabricating means at a slower rate, means for maintaining the strip fed by said continuous feeding mechanism under tension during the periods of dwell in the operation of said intermittent feeding means, mechanism actuated by said tension maintaining means for periodically discontinuing the operation of said continuous feeding means when the difference between the amount fed thereby and by said intermittent feeding means exceeds a predetermined amount and for continuing the operation thereof when said difference is reduced a predetermined amount, and means also actuated by said tension maintaining means for discontinuing the operation of the entire machine in the event that said continuous feeding means fails to supply sufficient paper to said intermittent feeding means.

21. Apparatus for making pockets for index or filing systems comprising means for feeding a strip of paper or other material continuously from a source of supply, means for driving said continuous feeding means, a clutch for connecting and disconnecting said continuous feeding means to and from said driving means, means for fabricating said strip into a pocket, means for intermittently feeding the paper thus continuously fed by said continuous feeding means to said pocket fabrication means at a slower rate than the continuous feed thereof, mechanism for periodically actuating said clutch to disconnect said continuous feeding means from said driving means when a predetermined amount of paper is fed thereby in excess to that fed by said intermittent feeding means and to connect said continuous feeding means to said driving means when said excess amount of paper is reduced a predetermined amount, and supplemental means actuated by said mechanism for discontinuing the operation of the entire machine in the event that said continuous feeding means fails to supply sufficient paper to said intermittent feeding means.

22. Apparatus for making pockets for index or filing systems comprising a plurality of rolls for feeding a strip of paper or other material continuously from a source of supply, a perforating device for forming card retaining apertures in said paper, means for intermittently feeding the paper thus continuously fed by said continuous feeding means to said perforating device at a slower rate, mechanism for periodically discontinuing the operation of said continuous feeding means when the difference between the amount fed thereby and by said intermittent feeding means exceeds a predetermined amount and for continuing the operation thereof when said difference is reduced to a predetermined minimum, means actuated by said mechanism for discontinuing the operation of the entire machine in the event that said continuous feeding means fails to supply sufficient paper to said intermittent feeding means, means for moving said rolls out of driving engagement with the paper, and a latch for selectively maintaining said rolls in an inoperative position.

23. Apparatus for making pockets for index or filing systems comprising a plurality of rolls for feeding a strip of paper or other material continuously from a source of supply, a perforating device for forming card retaining apertures in said paper, means for intermittently feeding the paper thus continuously fed by said continuous feeding means to said perforating device at a slower rate, mechanism for periodically discontinuing the operation of said continuous feeding means when the difference between the amount fed thereby and by said intermittent feeding means exceeds a predetermined amount and for continuing the operation thereof when said difference is reduced to a predetermined minimum, means actuated by said mechanism for discontinuing the operation of the entire machine in the event that said continuous feeding means fails to supply sufficient paper to said intermittent feeding means, manually operable means for moving said rolls out of driving engagement with the paper, a latch for selectively maintaining said rolls in an inoperative position when the operation of the machine is discontinued, and means operated by said perforating device for automatically releasing said latch when the operation of the machine is commenced.

24. Apparatus for making pockets for card index filing systems comprising a support, means for feeding a strip of paper or other material along said support, means for positioning a card retaining strip adjacent to an edge of said paper, and means located adjacent to said support and operating in timed relation to the movement of said paper for perforating said paper to provide card retaining apertures therein, attaching said card retaining strip thereto, and for separating said paper and the attached card retaining strip into sections of predetermined length.

25. Apparatus for making pockets for card index or filing systems comprising a perforating device, an attaching device and a separating device, a support associated with said devices, means for feeding a strip of paper or other material along said support, means for positioning a card retaining strip adjacent to an edge of said paper between said perforating and attaching devices, and means for simultaneously actuating said devices to provide card retaining perforations in one portion of said paper, attach said card retaining strip to another portion thereof and to separate another portion of said paper and the attached card retaining strip to form a section of predetermined length.

26. Apparatus for making pockets for card index or filing systems comprising a perforating device, an attaching device and a separating device, a support associated with said devices, means for intermittently feeding a strip of paper or other material along said support, means for positioning a card retaining strip adjacent to an edge of said paper between said perforating and attaching devices, and means for simultaneously actuating said devices during intervals of dwell in the movement of said paper to provide card retaining perforations in one portion of said paper, attach said card retaining strip to another portion thereof and to separate another portion of said paper and the attached card retaining strip to form a section of predetermined length.

27. Apparatus for making pockets for card index or filing systems comprising a perforating device, an attaching device and a separating device, a support associated with said devices, a reciprocating carriage for intermittently feeding a strip of paper or other material along said support, means for positioning a card retaining strip adjacent to an edge of said paper between said perforating and attaching devices, and means for simultaneously actuating said devices during intervals of dwell in the movement of said paper to provide card retaining perforations in one portion of said paper, attach said card retaining strip to another portion thereof and to separate another portion of said paper and the attached card retaining strip to form a section of predetermined length.

28. Apparatus for making pockets for card index or filing systems comprising a perforating device, an attaching device and a separating device, a support associated with said devices, a carriage mounted for reciprocation adjacent to said support, means on said carriage for gripping a strip of paper or other material and feeding it along said support, means for positioning a card retaining strip adjacent to an edge of said paper between said perforating and attaching devices, and means for simultaneously actuating said devices during intervals of dwell in the movement of said paper to provide card retaining perforations in one portion of said paper, attach said card retaining strip to another portion thereof and to separate another portion of said paper and the attached card retaining strip to form a section of predetermined length.

29. Apparatus for making pockets for card index or filing systems comprising means for attaching a sheath or card retaining member to a strip of paper or other material, means for severing the paper and attached card retaining member into sections of predetermined length, mechanism for attaching a lug or pocket retaining member to each section, a device for successively transferring the sections thus severed to said lug attaching means, mechanism for arranging the sections in stacks of predetermined number, a device for successively transferring said sections from said lug attaching means to said stacking mechanism, and means for simultaneously reciprocating said transferring devices toward and away from each other to and from positions in proximity to each other adjacent to said lug attaching means and positions remote from each other adjacent to said severing means and said stacking mechanism.

30. Apparatus for making pockets for card index or filing systems comprising means for attaching a sheath or card retaining member to a strip of paper or other material, means for severing the paper and attached card retaining member into sections of predetermined length, mechanism for attaching a lug or pocket retaining member to each section, a device for successively transferring the sections thus severed to said lug attaching means, mechanism for arranging the sections in stacks of predetermined number, a device for successively transferring said sections from said lug attaching means to said stacking mechanism, means for simultaneously reciprocating said transferring devices toward and away from each other to and from positions in proximity to each other adjacent to said lug attaching means and positions remote from each other adjacent to said severing means and said stacking mechanism, and means for varying the limits of travel of said devices.

31. Apparatus for making pockets for card index or filing systems comprising means for attaching a sheath or card retaining member to a strip of paper or other material, means for severing the paper and attached card retaining member into sections of predetermined length, mechanism for attaching a lug or pocket retaining member to each section, a suction device for successively transferring the sections thus severed to said lug attaching means, mechanism for arranging the sections in stacks of predetermined number, a suction device for successively transferring said sections from said lug attaching means to said stacking mechanism, means for simultaneously reciprocating said suction devices toward and away from each other to and from positions in proximity to each other adjacent to said lug attaching means and positions remote from each other adjacent to said severing means and said stacking mechanism, and means for controlling the application of suction to said devices.

32. Apparatus for making pockets for card index or filing systems comprising means for attaching a sheath or card retaining member to a strips of paper or other material, means for severing the paper and attached card retaining member into sections of predetermined length, mechanism for attaching a lug or pocket retaining member to each section, a track extending from said severing means to said lug attaching means, a carriage movably mounted on said track for successively transferring the sections thus severed to said lug attaching means, mechanism for arranging the sections in stacks of predetermined number, a track extending from said lug attaching means to said stacking mechanism, a carriage movably mounted on said second mentioned track for successively transferring said sections from said lug attaching means to said stacking mechanism, and means for simultaneously reciprocating said transferring devices toward and away from each other to and from positions in proximity to each other adjacent to said lug attaching means and positions remote from each other adjacent to said severing means and said stacking mechanism.

33. Apparatus for making pockets for card index or filing systems comprising means for attaching a sheath or card retaining member to a strip of paper or other material, means for severing the paper and attached card retaining member into sections of predetermined length, mechanism for attaching a lug or pocket retaining member to each section, a device for successively transferring the sections thus severed to said lug attaching means, means for maintaining the sections against displacement from said device, mechanism for arranging the sections in stacks of predetermined number, a device for successively transferring said sections from said lug attaching means to said stacking mechanism, means for maintaining the sections against displacement from said second mentioned device, means for simultaneously reciprocating said transferring devices toward and away from each other to and from positions in proximity to each other adjacent to said lug attaching means and positions remote from each other adjacent to said severing means and said stacking mechanism, and means for timing the engagement and release of said sections with and from said devices, whereby a section is simultaneously maintained in engagement with both of said devices during the lug attaching operation.

34. Apparatus for making pockets for card index or filing systems comprising means for attaching a sheath or card retaining member to a strip of paper or other material, means for severing the paper and attached card retaining member into sections of predetermined length, mechanism for attaching a lug or pocket retaining member to each section, a support, means for transferring the pocket thus fabricated to said support, and means for removing said support from engagement with said pockets at predetermined intervals.

35. Apparatus for making pockets for card index or filing systems comprising means for attaching a sheath or card retaining member to a strip of paper or other material, means for severing the paper and attached card retaining member into sections of predetermined length, mechanism for attaching a lug or pocket retaining member to each section, means for creasing said pocket adjacent said pocket retaining member to form a hinge, a support, means for transferring the pocket thus fabricated to said support, and means for removing said support from engagement with said pockets at predetermined intervals.

36. Apparatus for making pockets for card index or filing systems comprising means for attaching a sheath or card retaining member to a strip of paper or other material, means for severing the paper and attached card retaining member into sections of predetermined length, mechanism for attaching a lug or pocket retaining member to each section, a support comprising a pair of laterally spaced bars, means for transferred the pocket thus fabricated to said support, means for periodically moving said bars away from each other to release a predetermined number of said pockets, and yieldable means for returning said bars to a pocket supporting position.

37. Apparatus for making pockets for card index or filing systems comprising means for attaching a sheath or card retaining member to a strip of paper or other material, means for severing the paper and attached card retaining member into sections of predetermined length, mechanism for attaching a lug or pocket retaining member to each section, a support, means for depositing a determinate number of fabricated pockets upon said support in stacked arrangement, a secondary support, means for transferring stacked groups to said secondary support, and means for delivering a predetermined number of stacked groups from said secondary support simultaneously.

38. Apparatus for making pockets for car index or filing systems comprising means for attaching a sheath or card retaining member to a strip of paper or other material, means for severing the paper and attached card retaining member into sections of predetermined length, mechanism for attaching a lug or pocket retaining member to each section, means for successively creasing and stacking the pockets thus fabricated, and means for delivering groups of stacked pockets from the machine.

39. Apparatus for making pockets for card index or filing systems comprising means for attaching a sheath or card retaining member to a strip of paper or other material, means for severing the paper and attached card retaining member into sections of predetermined length, mechanism for attaching a lug or pocket retaining member to each section, a support, means for successively transferring the pockets thus fabricated to said support and stacking them thereon in superposed relation, a second support, means for removing said first named support from supporting engagement with the pockets at predetermined intervals to permit them to fall upon said second mentioned support, and means for periodically releasing said second mentioned support in timed relation with the actuation of said first mentioned support.

40. Apparatus for making pockets for card index or filing systems comprising means for attaching a sheath or card retaining member to a strip of paper or other material, means for severing the paper and attached card retaining member into sections of predetermined length, mechanism for attaching a lug or pocket retaining member to each section, means for creasing said pocket adjacent to said lug to form a hinge, a support, means for successively transferring the pockets thus fabricated to said support and stacking them thereon in superposed relation, a second support, means for removing said first named support from supporting engagement with the pockets at predetermined intervals to permit them to fall upon said second mentioned support, and means for periodically releasing said second mentioned support in timed relation with the actuation of said first mentioned support.

41. Apparatus for making pockets for card index or filing systems comprising means for attaching a sheath or card retaining member to a strip of paper or other material, means for severing the paper and attached card retaining member into sections of predetermined length, mechanism for attaching a lug or pocket retaining member to each section, means for creasing said lug to provide an offset therein, a support, means for successively transferring the pockets thus fabricated to said support and stacking them thereon with said lug in nested relation, a second support, means for removing said first named support from supporting engagement with the pockets at predetermined intervals to permit them to fall upon said second mentioned support, and means for periodically releasing said second mentioned support in timed relation with the actuation of said first mentioned support.

42. Apparatus for making pockets for card index or filing systems comprising means for attaching a sheath or card retaining member to a strip of paper or other material, means for severing the paper and attached card retaining member into sections of predetermined length, mechanism for attaching a lug or pocket retaining member to each section, a pair of supports arranged in superposed relation relative to each other, means for successively transferring the pockets thus fabricated to the upper support and arranging them thereon in stacked relation, means for periodically releasing a stack of pockets of predetermined number from said upper support to permit it to be engaged by the lower support, and means for actuating said lower support to periodically release a plurality of stacks delivered thereto from said upper support.

43. Apparatus for making pockets for card index or filing systems comprising means for attaching a sheath or card retaining member to a strip of paper or other material, means for severing the paper and attached card retaining member into sections of predetermined length, mechanism for attaching a lug or pocket retaining member to each section, a pair of supports arranged in superposed relation relative to each other, means for successively transferring the pockets thus fabricated to the upper support and arranging them thereon in stacked relation, ratchet mechanism for periodically releasing a stack of pockets of predetermined number from said upper support to permit it to be engaged by the lower support and for actuating said lower support to periodically release a plurality of stacks delivered thereto from said upper support.

44. The method of making pockets for filing systems which comprises engaging a sheath of resilient material in embracing relation on a margin of a strip of sheet material to resiliently grip said sheet material along said margin, then attaching said sheath to said strip, and subsequently severing said strip and attached sheath into sections of predetermined length.

45. The method of making pockets for filing systems which comprises perforating a strip of sheet material at regular intervals to provide spaced groups of card retaining apertures therein, engaging a sheath of resilient material about one margin of the strip to resiliently grip said margin permanently securing the sheath to the strip, and then severing the strip and attached sheath into sections at a point between said spaced groups of apertures.

46. The method of making pockets for filing systems which comprises perforating an elongated strip of material at regular intervals to provide spaced longitudinally arranged groups of card retaining apertures therein, engaging the ends of a folded sheath of resilient material about opposite faces of one side margin of the strip to resiliently grip said margin, permanently securing the sheath to the strip, and then severing the strip and attached sheath transversely into sections between spaced groups of apertures.

47. An apparatus for making pockets for filing systems comprising, means for engaging a sheath having resilient portions in embracing relation on a margin of a strip of material to resiliently grip said margin, a securing device, means for feeding said strip and engaged sheath to said securing device, means controlled by the operation of the feeding means for actuating said securing device to permanently attach the sheath to the strip, and means for simultaneously severing said strip and attached sheath into sections.

48. The method of making pockets for filing systems which comprises, engaging a card retaining strip on one margin of a strip of sheet material, subsequently attaching said card retaining strip to said sheet material at spaced intervals, and finally separating said sheet material strip with the attached card retaining strip intermediate attached portions successively, into separate card holders.

49. The method of making pockets for filing systems which comprises, individualizing sections of a strip of sheet material, engaging a folded retaining strip over a margin of said strip of sheet material in embracing relation on said margin, attaching said retaining strip to said sheet adjacent the ends of each section, and severing said sections to form individual pockets.

50. The method of making pockets for filing systems which comprises, individualizing sections of a strip of sheet material, providing notches in one margin at the juncture of said sections, engaging a folded strip over said margin to embrace opposite faces of said sheet material, applying fasteners to said retaining strip in the portions registering with said notches and adjacent portions of each section successively, and finally severing said sections to form individual pockets.

51. The method of making card index devices which comprises, severing a strip of sheet material into sections of predetermined length, attaching a lug to a margin of each of the sections, and folding each section along a predetermined line to form a hinge.

52. Apparatus for making index devices comprising means for severing a strip of sheet material into sections of a predetermined length, mechanism operating in timed relation to said severing means for attaching a lug to one margin of each section, and means for positioning said severed sections in said attaching mechanism.

53. Apparatus for making card index devices comprising means for severing a strip of sheet material into sections of predetermined length, mechanism operating in timed relation to said severing means for attaching a lug to a margin of each section, a support, means for transferring the sections and attached lugs to said support, and means for removing said support from engagement with said sections at predetermined intervals.

54. Apparatus for making card index devices comprising means for severing a strip of sheet material into sections of predetermined length, mechanism operating in timed relation to said severing means for attaching a lug to a margin of each section, means for successively creasing and stacking the sections thus fabricated, and means for delivering groups of stacked pockets from the machine.

55. In combination, means of successively individualizing sections of a strip of sheet material, means for engaging a folded strip over a margin of said first-mentioned strip, means for securing said engaged strips together adjacent the ends of said sections, and means for severing said sections from said first-mentioned strip with the attached portion of the folded strip to form a card holder.

56. In combination, means for successively forming notches in a margin of a strip of sheet material to individualize sections of said strip, means for engaging a second strip on said margin of the first-mentioned strip, means for attaching said second strip to the first strip at said notches and at opposite ends of each section, successively, and means for severing said sections and attached portions of said second strip to form individual card holders.

57. An apparatus for making pockets for filing systems, comprising a securing device, means for feeding a strip of sheet material to said device, means for separating the resiliently engaged edge portions of a folded strip and engaging said edges over opposite sides of a margin of the first-mentioned strip for resiliently gripping said strip, means for actuating said securing device to attach portions of said folded strip to said first-mentioned strip at spaced intervals, and means operating in timed relation to said securing device for severing said strips into sections with the folded strip attached to the first-mentioned strip at its opposite extremities.

58. Apparatus for making pockets for filing systems, comprising feed rolls for feeding a strip of sheet material from a source of supply, means for fabricating said strip into pockets, an intermittent feed means receiving said strip from said feed rolls and conveying the same to said fabricating means in timed relation to the operation thereof, a continuous drive means for the feed rolls, clutch means operable to connect the drive means to the feed rolls, a roller supported by the portion of the strip of material between the feed rolls and the intermittent feed means, guide means for the roller and control mechanism for said clutch means adjacent said guide means, said roller by its weight tensioning the strip of material between the feed rolls and feed means and being gravitationally movable on its guide means to operate said control mechanism to disconnect said clutch when the length of the strip is excessive and to be moved upwardly by the strip to operate said control mechanism to connect said clutch.

EDWARD W. SIBLEY.